(12) United States Patent
Chen et al.

(10) Patent No.: US 11,317,454 B2
(45) Date of Patent: *Apr. 26, 2022

(54) METHOD AND APPARATUS FOR IMPROVING ONE-TO-ONE SIDELINK COMMUNICATION IN A WIRELESS COMMUNICATION SYSTEM

(71) Applicant: ASUSTek Computer Inc., Taipei (TW)

(72) Inventors: Wei-Yu Chen, Taipei (TW); Richard Lee-Chee Kuo, Taipei (TW); Li-Chih Tseng, Taipei (TW); Li-Te Pan, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 77 days.

This patent is subject to a terminal disclaimer.

(21) Appl. No.: 16/874,179

(22) Filed: May 14, 2020

(65) Prior Publication Data
US 2020/0275502 A1    Aug. 27, 2020

Related U.S. Application Data

(63) Continuation of application No. 16/670,381, filed on Oct. 31, 2019, now Pat. No. 10,721,787.

(Continued)

(51) Int. Cl.
*H04W 76/14*        (2018.01)
*H04W 4/40*         (2018.01)
(Continued)

(52) U.S. Cl.
CPC ............. *H04W 76/14* (2018.02); *H04W 4/40* (2018.02); *H04W 28/0278* (2013.01); *H04W 72/042* (2013.01); *H04W 88/06* (2013.01)

(58) Field of Classification Search
CPC . H04W 28/0278; H04W 4/40; H04W 72/042; H04W 72/1284; H04W 76/10; H04W 76/14; H04W 88/06
See application file for complete search history.

(56) References Cited

U.S. PATENT DOCUMENTS

| 10,721,787 B2 * | 7/2020 | Chen ................. H04W 72/1284 |
| 2015/0156780 A1 * | 6/2015 | Kim ...................... H04W 36/22 370/331 |

(Continued)

FOREIGN PATENT DOCUMENTS

WO    WO-2017189035 A1 * 11/2017    .............. H04W 4/40

*Primary Examiner* — Kashif Siddiqui
(74) *Attorney, Agent, or Firm* — Blue Capital Law Firm, P.C.

(57) ABSTRACT

A method and apparatus are disclosed from the perspective of a User Equipment (UE) for the UE to request sidelink resources for an one-to-one V2X (Vehicle-to-Everything) sidelink communication, wherein the UE supports both LTE (Long Term Evolution) RAT (Radio Access Technology) and NR (New Radio) RAT. In one embodiment, the method includes the UE initiating a one-to-one V2X sidelink communication. The method further includes the UE transmitting a RRC (Radio Resource Control) message to a network node to request sidelink resources from NR RAT for the one-to-one V2X sidelink communication and not transmitting any RRC message to the network node to request sidelink resources from LTE RAT for the one-to-one V2X sidelink communication.

16 Claims, 15 Drawing Sheets

Related U.S. Application Data

(60) Provisional application No. 62/756,284, filed on Nov. 6, 2018.

(51) Int. Cl.
  *H04W 28/02* (2009.01)
  *H04W 72/04* (2009.01)
  *H04W 88/06* (2009.01)

(56) References Cited

U.S. PATENT DOCUMENTS

| | | | | |
|---|---|---|---|---|
| 2018/0132208 | A1* | 5/2018 | Pan | H04W 72/0406 |
| 2018/0368191 | A1* | 12/2018 | Vutukuri | H04W 56/00 |
| 2019/0089498 | A1* | 3/2019 | Pelletier | H04L 5/003 |
| 2019/0150176 | A1* | 5/2019 | Pelletier | H04W 72/0453 370/329 |
| 2019/0239112 | A1* | 8/2019 | Rao | H04W 4/70 |
| 2019/0349730 | A1* | 11/2019 | Kim | H04W 4/06 |
| 2020/0059954 | A1* | 2/2020 | Wu | H04W 28/0278 |
| 2021/0219110 | A1* | 7/2021 | Kousaridas | H04W 76/18 |

* cited by examiner

| Destination index₁ | LCG ID₁ | Buffer Size₁ | Oct 1 |
| Buffer Size₁ | Destination index₂ | | Oct 2 |
| LCG ID₂ | Buffer Size₂ | | Oct 3 |

...

| Destination index_{N-1} | LCG ID_{N-1} | Buffer Size_{N-1} | Oct 1.5*N-2 |
| Buffer Size_{N-1} | Destination index_N | | Oct 1.5*N-1 |
| LCG ID_N | Buffer Size_N | | Oct 1.5*N |

FIG. 5 (PRIOR ART)

| Destination index₁ | LCG ID₁ | Buffer Size₁ | Oct 1 |
| Buffer Size₁ | Destination index₂ | | Oct 2 |
| LCG ID₂ | Buffer Size₂ | | Oct 3 |

...

| Destination index_N | LCG ID_N | Buffer Size_N | Oct 1.5*N-0.5 |
| Buffer Size_N | R | R | R | R | Oct 1.5*N+0.5 |

FIG. 6 (PRIOR ART)

R/R/E/LCID/F/L sub-header with 7-bits L field

R/R/E/LCID/F/L sub-header with 15-bits L field

R/R/E/LCID sub-header

METHOD AND APPARATUS FOR IMPROVING ONE-TO-ONE SIDELINK COMMUNICATION IN A WIRELESS COMMUNICATION SYSTEM

CROSS-REFERENCE TO RELATED APPLICATIONS

This application is a Continuation of U.S. patent application Ser. No. 16/670,381, filed Oct. 31, 2019, which claims the benefit of U.S. Provisional Patent Application Ser. No. 62/756,284 filed on Nov. 6, 2018, the entire disclosures of which are incorporated herein in their entirety by reference.

FIELD

This disclosure generally relates to wireless communication networks, and more particularly, to a method and apparatus for improving one-to-one sidelink communication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a User Equipment (UE) for the UE to request sidelink resources for an one-to-one V2X (Vehicle-to-Everything) sidelink communication, wherein the UE supports both LTE (Long Term Evolution) RAT (Radio Access Technology) and NR (New Radio) RAT. In one embodiment, the method includes the UE initiating a one-to-one V2X sidelink communication. The method further includes the UE transmitting a RRC (Radio Resource Control) message to a network node to request sidelink resources from NR RAT for the one-to-one V2X sidelink communication and not transmitting any RRC message to the network node to request sidelink resources from LTE RAT for the one-to-one V2X sidelink communication.

BRIEF DESCRIPTION OF THE DRAWINGS

FIG. 5 is a reproduction of FIG. 6.1.3.1a-1 of 3GPP TS 36.321 V15.3.0.

FIG. 6 is a reproduction of FIG. 6.1.3.1a-2 of 3GPP TS 36.321 V15.3.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 24.386 V15.1.0, "User Equipment (UE) to V2X control function; protocol aspects; Stage 3 (Release 15)"; TS 36.321 V15.3.0, "Evolved Universal Terrestrial Radio Access (E-UTRA); Medium Access Control (MAC) protocol specification"; RAN1#94 Chairman's Note; TS 36.331 V15.2.2, "Evolved Universal Terrestrial Radio Access (E-UTRA); Radio Resource Control (RRC); Protocol specification". The standards and documents listed above are hereby expressly incorporated by reference in their entirety.

Figure 1:
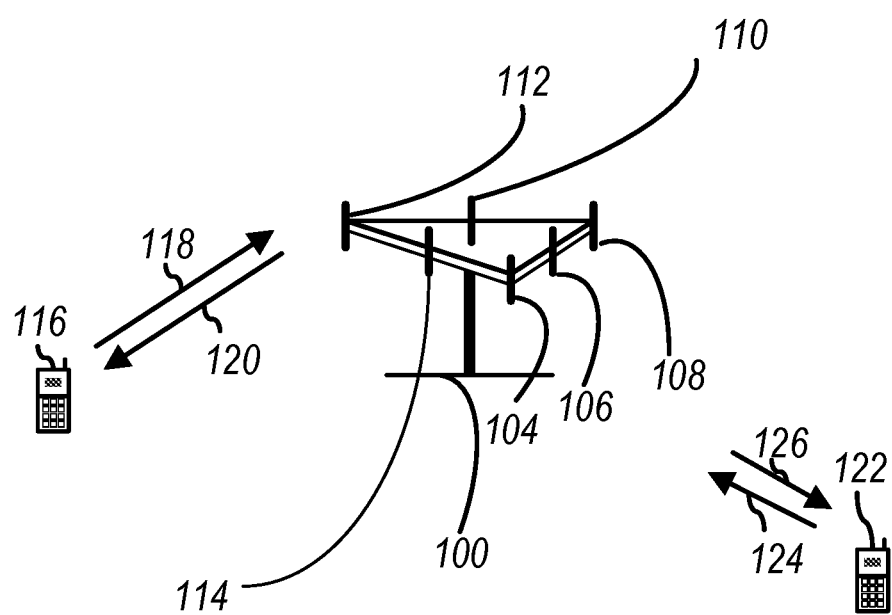
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
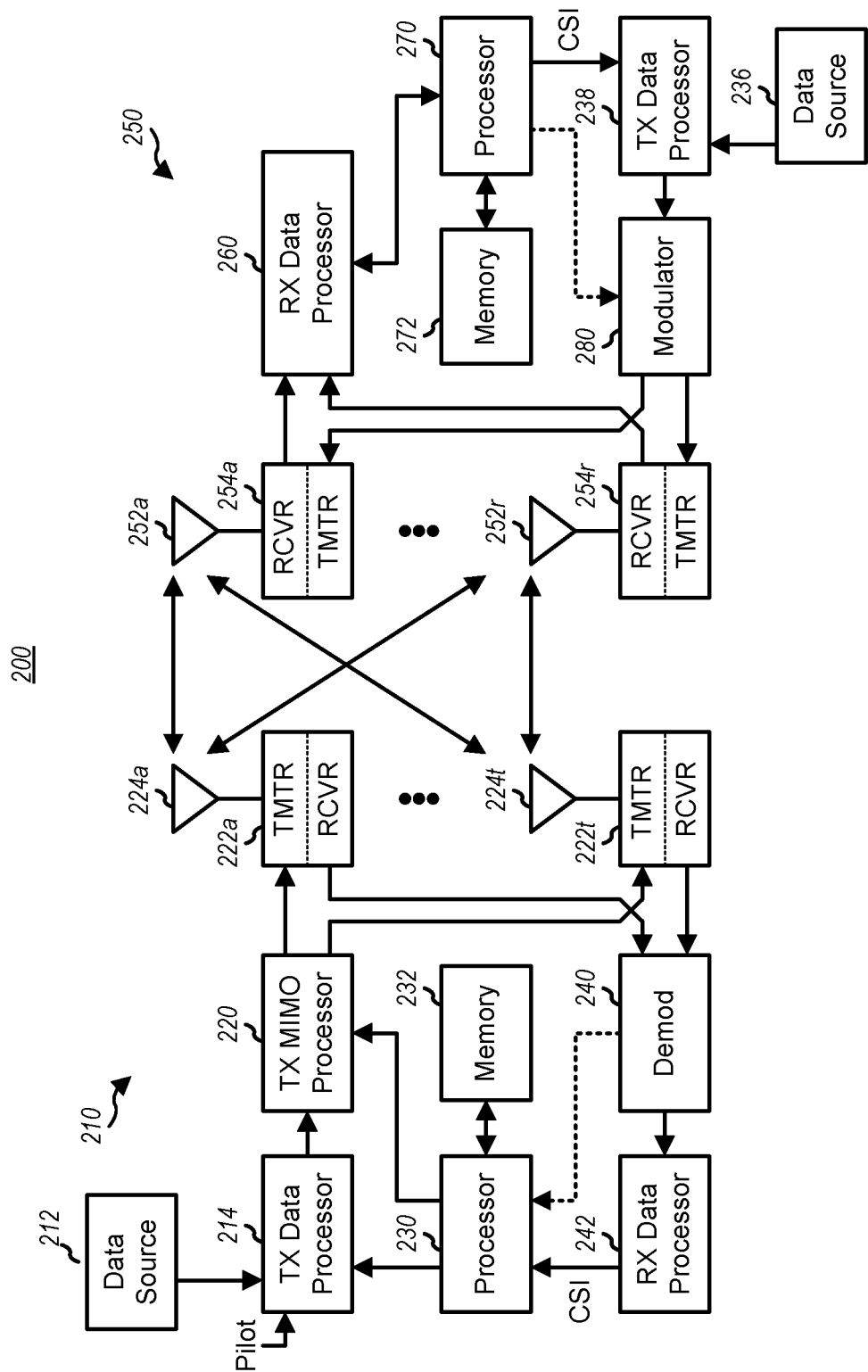
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
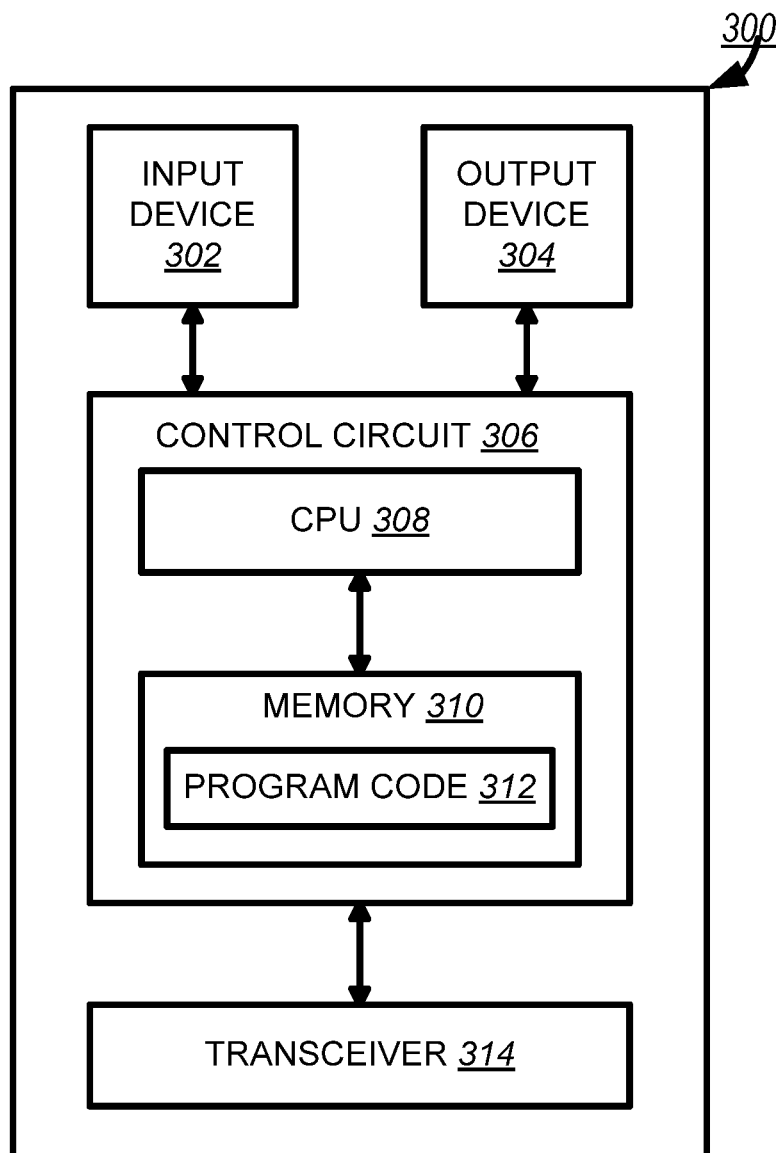
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE or NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
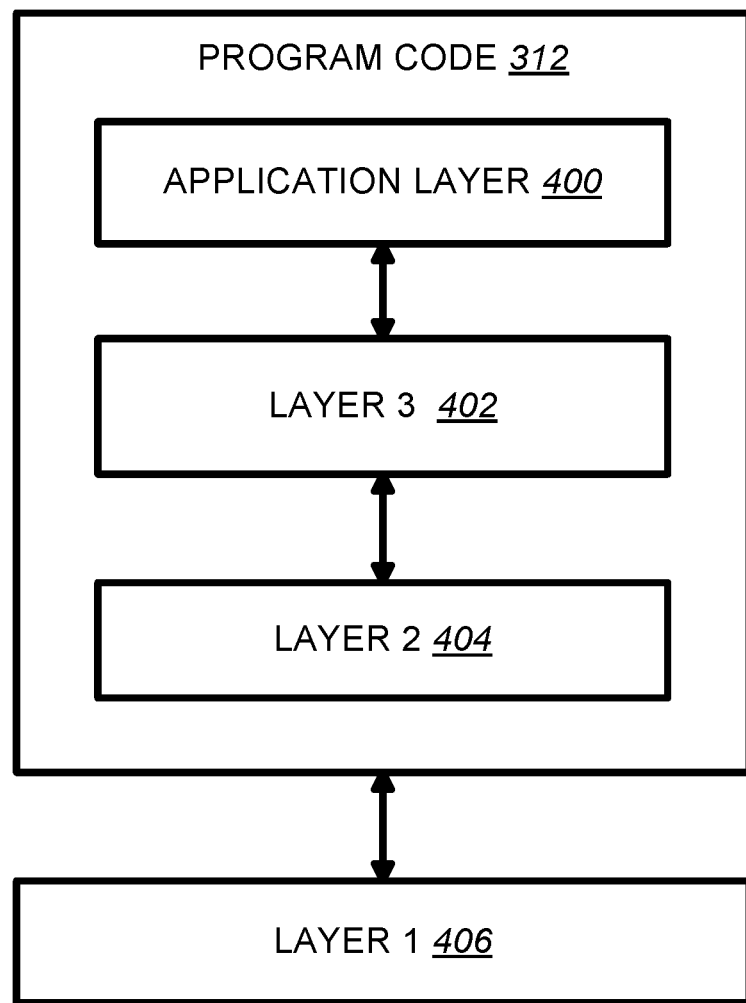
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 24.386 V15.1.0 describes configuration parameters and transmission behaviors related to transmission profile, destination layer-2 ID, and source layer-2 ID as follows:

5.2.4 Configuration Parameters for V2X Communication Over PC5

The configuration parameters for V2X communication over PC5 consist of:
- a) an expiration time for the validity of the configuration parameters for V2X communication over PC5;
- b) a list of PLMNs in which the UE is authorized to use V2X communication over PC5 when the UE is served by E-UTRAN for V2X communication;
- c) an indication of whether the UE is authorized to use V2X communication over PC5 when the UE is not served by E-UTRAN for V2X communication;
- d) per geographical area:
  1) radio parameters for V2X communication over PC5 applicable when the UE is not served by E-UTRAN for V2X communication and is located in the geographical area, with an indication of whether these radio parameters are "operator managed" or "non-operator managed";
- e) a list of the V2X services authorized for V2X communication over PC5. Each entry of the list contains:
1) a V2X service identifier; and
2) a destination Layer-2 ID;
- f) PPPP to PDB mapping rules between the ProSe Per-Packet Priority (PPPP) and the Packet Delay Budget (PDB) for V2X communication over PC5;
- g) optionally, a default destination Layer-2 ID;
- h) optionally, a configuration for the applicability of privacy for V2X communication over PC5, containing:
  1) a T5000 timer indicating how often the UE shall change the source Layer-2 ID and source IP address (for IP data) self-assigned by the UE for V2X communication over PC5; and
  2) a list of the V2X services which require privacy for V2X communication over PC5. Each entry in the list contains:
    A) a V2X service identifier; and
    B) optionally, one or more associated geographical areas;
- i) optionally, V2X service identifier to V2X frequency mapping rules between the V2X service identifiers and the V2X frequencies with associated geographical areas for V2X communication over PC5; and
- j) optionally, a list of the V2X services authorized for ProSe Per-Packet Reliability (PPPR). Each entry of the list contains a V2X service identifier and a ProSe Per-Packet Reliability (PPPR) value; and
- k) optionally, V2X service identifier to Tx Profile mapping rules between the V2X service identifiers and the Tx Profile for V2X communication over PC5.

6.1.2.2 Transmission

The UE shall include the V2X message in a protocol data unit and pass it to the lower layers for transmission along with the following parameters:
- a) a Layer-3 protocol data unit type (see 3GPP TS 36.323 [8]) set to:
  1) IP packet, if the V2X message contains IP data; or
  2) non-IP packet, if the V2X message contains non-IP data;
- b) the source Layer-2 ID set to the Layer-2 ID self-assigned by the UE for V2X communication over PC5;
- c) the destination Layer-2 ID set to:
  1) the destination Layer-2 ID associated with the V2X service identifier of the V2X service in this list of V2X services authorized for V2X communication over PC5 as specified in subclause 5.2.4, if the V2X service identifier of the V2X service is included in the list of V2X services authorized for V2X communication over PC5 as specified in subclause 5.2.4; or
  2) the default destination Layer-2 ID configured to the UE for V2X communication over PC5 as specified in subclause 5.2.4, if the V2X service identifier of the V2X service is not included in the list of V2X services authorized for V2X communication over PC5 and the UE is configured with a default destination Layer-2 ID for V2X communication over PC5;
- d) if the V2X message contains non-IP data, an indication to set the non-IP type field of the non-IP type PDU to the value corresponding to the V2X message family (see subclause 7.1) used by the V2X service as indicated by upper layers;
- e) if the V2X message contains IP data, the source IP address set to the source IP address self-assigned by the UE for V2X communication over PC5;
- f) the ProSe Per-Packet Priority set to the value corresponding to the V2X message priority received from upper layers. The mapping of V2X message priority to ProSe Per-Packet Priority is configured on the UE and is out of the scope of this specification;
- g) if the UE is configured with PDB (Packet Delay Budget)-to-ProSe Per-Packet Priority mapping rules for V2X communication over PC5 as specified in subclause 5.2.4, the PDB associated with the ProSe Per-Packet Priority as specified in subclause 5.2.4;
- h) if:
  1) a ProSe Per-Packet Reliability (PPPR) value is received from the upper layers; and
  2) one of the following conditions is met:
    A) the list of the V2X services authorized for ProSe Per-Packet Reliability (PPPR) is not configured; or
    B) the V2X service identifier of the V2X service for the V2X message and the received ProSe Per-Packet Reliability (PPPR) value are included in an entry of the list of the V2X services authorized for ProSe Per-Packet Reliability (PPPR);
  then the ProSe Per-Packet Reliability (PPPR) value; and
- i) if the UE is configured with V2X service identifier to Tx Profile mapping rules for V2X communication over PC5 as specified in subclause 5.2.4, the Tx Profile associated with the V2X service identifier as specified in subclause 5.2.4.

If the UE has an emergency PDN connection, the UE shall send an indication to the lower layers to prioritize transmission over the emergency PDN connection as compared to transmission of V2X communication over PC5.

Sidelink resource allocation and utilization mechanism are described in the current MAC specification (3GPP TS 36.321 V15.3.0) as follows:

5.14 SL-SCH Data Transfer
5.14.1 SL-SCH Data Transmission
5.14.1.1 SL Grant Reception and SCI Transmission
In order to transmit on the SL-SCH the MAC entity must have at least one sidelink grant.
Sidelink grants are selected as follows for sidelink communication:
 if the MAC entity is configured to receive a single sidelink grant dynamically on the PDCCH and more data is available in STCH than can be transmitted in the current SC period, the MAC entity shall:
  using the received sidelink grant determine the set of subframes in which transmission of SCI and transmission of first transport block occur according to subclause 14.2.1 of [2];
  consider the received sidelink grant to be a configured sidelink grant occurring in those subframes starting at the beginning of the first available SC Period which starts at least 4 subframes after the subframe in which the sidelink grant was received, overwriting a previously configured sidelink grant occurring in the same SC period, if available;
  clear the configured sidelink grant at the end of the corresponding SC Period;
 else, if the MAC entity is configured by upper layers to receive multiple sidelink grants dynamically on the PDCCH and more data is available in STCH than can be transmitted in the current SC period, the MAC entity shall for each received sidelink grant:
  using the received sidelink grant determine the set of subframes in which transmission of SCI and transmission of first transport block occur according to subclause 14.2.1 of [2];
  consider the received sidelink grant to be a configured sidelink grant occurring in those subframes starting at the beginning of the first available SC Period which starts at least 4 subframes after the subframe in which the sidelink grant was received, overwriting a previously configured sidelink grant received in the same subframe number but in a different radio frame as this configured sidelink grant occurring in the same SC period, if available;
  clear the configured sidelink grant at the end of the corresponding SC Period;
 else, if the MAC entity is configured by upper layers to transmit using one or multiple pool(s) of resources as indicated in subclause 5.10.4 of [8] and more data is available in STCH than can be transmitted in the current SC period, the MAC entity shall for each sidelink grant to be selected:
  if configured by upper layers to use a single pool of resources:
   select that pool of resources for use;
  else, if configured by upper layers to use multiple pools of resources:
   select a pool of resources for use from the pools of resources configured by upper layers whose associated priority list includes the priority of the highest priority of the sidelink logical channel in the MAC PDU to be transmitted;
   NOTE: If more than one pool of resources has an associated priority list which includes the priority of the sidelink logical channel with the highest priority in the MAC PDU to be transmitted, it is left for UE implementation which one of those pools of resources to select.
  randomly select the time and frequency resources for SL-SCH and SCI of a sidelink grant from the selected resource pool. The random function shall be such that each of the allowed selections [2] can be chosen with equal probability;
  use the selected sidelink grant to determine the set of subframes in which transmission of SCI and transmission of first transport block occur according to subclause 14.2.1 of [2];
  consider the selected sidelink grant to be a configured sidelink grant occurring in those subframes starting at the beginning of the first available SC Period which starts at least 4 subframes after the subframe in which the sidelink grant was selected;
  clear the configured sidelink grant at the end of the corresponding SC Period;
   NOTE: Retransmissions on SL-SCH cannot occur after the configured sidelink grant has been cleared.
   NOTE: If the MAC entity is configured by upper layers to transmit using one or multiple pool(s) of resources as indicated in subclause 5.10.4 of [8], it is left for UE implementation how many sidelink grants to select within one SC period taking the number of sidelink processes into account.
Sidelink grants are selected as follows for V2X sidelink communication:
 if the MAC entity is configured to receive a sidelink grant dynamically on the PDCCH and data is available in STCH, the MAC entity shall:
  use the received sidelink grant to determine the number of HARQ retransmissions and the set of subframes in which transmission of SCI and SL-SCH occur according to subclause 14.2.1 and 14.1.1.4A of [2];
  consider the received sidelink grant to be a configured sidelink grant;
 if the MAC entity is configured by upper layers to receive a sidelink grant on the PDCCH addressed to SL Semi-Persistent Scheduling V-RNTI, the MAC entity shall for each SL SPS configuration:
  if PDCCH contents indicate SPS activation:
   use the received sidelink grant to determine the number of HARQ retransmissions and the set of subframes in which transmission of SCI and SL-SCH occur according to subclause 14.2.1 and 14.1.1.4A of [2];
   consider the received sidelink grant to be a configured sidelink grant;
  if PDCCH contents indicate SPS release:
   clear the corresponding configured sidelink grant;
 if the MAC entity is configured by upper layers to transmit using pool(s) of resources in one or multiple carriers as indicated in subclause 5.10.13.1 of [8] based on sensing, or partial sensing, or random selection only if upper layers indicates that transmissions of multiple MAC PDUs are allowed according to subclause 5.10.13.1a of [8], and the MAC entity selects to create a configured sidelink grant corresponding to transmissions of multiple MAC PDUs, and data is available in STCH associated with one or multiple carriers, the MAC entity shall for each Sidelink process configured for multiple transmissions on a selected carrier according to subclause 5.14.1.5:

if SL_RESOURCE_RESELECTION_COUNTER=0 and when SL_RESOURCE_RESELECTION_COUNTER was equal to 1 the MAC entity randomly selected, with equal probability, a value in the interval [0, 1] which is above the probability configured by upper layers in probResourceKeep; or if neither transmission nor retransmission has been performed by the MAC entity on any resource indicated in the configured sidelink grant during the last second; or if sl-ReselectAfter is configured and the number of consecutive unused transmission opportunities on resources indicated in the configured sidelink grant is equal to sl-ReselectAfter; or if there is no configured sidelink grant; or if the configured sidelink grant cannot accommodate a RLC SDU by using the maximum allowed MCS configured by upper layers in maxMCS-PSSCH and the MAC entity selects not to segment the RLC SDU; or NOTE: If the configured sidelink grant cannot accommodate the RLC SDU, it is left for UE implementation whether to perform segmentation or sidelink resource reselection.

if transmission(s) with the configured sidelink grant cannot fulfil the latency requirement of the data in a sidelink logical channel according to the associated PPPP, and the MAC entity selects not to perform transmission(s) corresponding to a single MAC PDU; or NOTE: If the latency requirement is not met, it is left for UE implementation whether to perform transmission(s) corresponding to single MAC PDU or sidelink resource reselection.

if a pool of resources is configured or reconfigured by upper layers for the selected carrier:
 clear the configured sidelink grant, if available;
 trigger the TX carrier (re-)selection procedure as specified in sub-clause 5.14.1.5;

if the carrier is (re-)selected in the Tx carrier (re-)selection according to sub-clause 5.14.1.5, the following is performed on the selected carrier:

select one of the allowed values configured by upper layers in restrictResourceReservationPeriod and set the resource reservation interval by multiplying 100 with the selected value;

NOTE: How the UE selects this value is up to UE implementation.

randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;

select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) allowed on the selected carrier and the CBR measured by lower layers according to [6] if CBR measurement results are available or the corresponding defaultTxConfigIndex configured by upper layers if CBR measurement results are not available;

select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) allowed on the selected carrier and the CBR measured by lower layers according to [6] if CBR measurement results are available or the corresponding defaultTxConfigIndex configured by upper layers if CBR measurement results are not available;

if transmission based on random selection is configured by upper layers:
 randomly select the time and frequency resources for one transmission opportunity from the resource pool, according to the amount of selected frequency resources. The random function shall be such that each of the allowed selections can be chosen with equal probability;
else:
 randomly select the time and frequency resources for one transmission opportunity from the resources indicated by the physical layer according to sub-clause 14.1.1.6 of [2], according to the amount of selected frequency resources. The random function shall be such that each of the allowed selections can be chosen with equal probability;

use the randomly selected resource to select a set of periodic resources spaced by the resource reservation interval for transmission opportunities of SCI and SL-SCH corresponding to the number of transmission opportunities of MAC PDUs determined in subclause 14.1.1.4B of [2];

if the number of HARQ retransmissions is equal to 1 and there are available resources left in the resources indicated by the physical layer that meet the conditions in subclause 14.1.1.7 of [2] for more transmission opportunities:

randomly select the time and frequency resources for one transmission opportunity from the available resources, according to the amount of selected frequency resources. The random function shall be such that each of the allowed selections can be chosen with equal probability;

use the randomly selected resource to select a set of periodic resources spaced by the resource reservation interval for the other transmission opportunities of SCI and SL-SCH corresponding to the number of retransmission opportunities of the MAC PDUs determined in subclause 14.1.1.4B of [2];

consider the first set of transmission opportunities as the new transmission opportunities and the other set of transmission opportunities as the retransmission opportunities;

consider the set of new transmission opportunities and retransmission opportunities as the selected sidelink grant.

else:
consider the set as the selected sidelink grant;
use the selected sidelink grant to determine the set of subframes in which transmissions of SCI and SL-SCH occur according to subclause 14.2.1 and 14.1.1.4E3 of [2];
consider the selected sidelink grant to be a configured sidelink grant;

else if SL_RESOURCE_RESELECTION_COUNTER=0 and when SL_RESOURCE_RESELECTION_COUNTER was equal to 1 the MAC entity randomly selected, with equal probability, a value in the interval [0, 1] which is less than or equal to the probability configured by upper layers in probResourceKeep:
clear the configured sidelink grant, if available;
randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;
use the previously selected sidelink grant for the number of transmissions of the MAC PDUs determined in subclause 14.1.1.4E3 of [2] with the resource reservation interval to determine the set of subframes in which transmissions of SCI and SL-SCH occur according to subclause 14.2.1 and 14.1.1.4E3 of [2];
consider the selected sidelink grant to be a configured sidelink grant;

else, if the MAC entity is configured by upper layers to transmit using pool(s) of resources in one or multiple carriers as indicated in subclause 5.10.13.1 of [8], the MAC entity selects to create a configured sidelink grant corresponding to transmission(s) of a single MAC PDU, and data is available in STCH associated with one or multiple carriers, the MAC entity shall for a Sidelink process on a selected carrier according to subclause 5.14.1.5:
trigger the TX carrier (re-)selection procedure as specified in sub-clause 5.14.1.5;
if the carrier is (re-)selected in the Tx carrier (re-)selection according to sub-clause 5.14.1.5, the following is performed on the selected carrier:
select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) allowed on the selected carrier and the CBR measured by lower layers according to [6] if CBR measurement results are available or the corresponding defaultTxConfigIndex configured by upper layers if CBR measurement results are not available;
select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) allowed on the selected carrier and the CBR measured by lower layers according to [6] if CBR measurement results are available or the corresponding defaultTxConfigIndex configured by upper layers if CBR measurement results are not available;
if transmission based on random selection is configured by upper layers:
randomly select the time and frequency resources for one transmission opportunity of SCI and SL-SCH from the resource pool, according to the amount of selected frequency resources. The random function shall be such that each of the allowed selections can be chosen with equal probability;
else:
randomly select the time and frequency resources for one transmission opportunity of SCI and SL-SCH from the resources indicated by the physical layer according to subclause 14.1.1.6 of [2], according to the amount of selected frequency resources. The random function shall be such that each of the allowed selections can be chosen with equal probability;
if the number of HARQ retransmissions is equal to 1:
if transmission based on random selection is configured by upper layers and there are available resources that meet the conditions in subcause 14.1.1.7 of [2] for one more transmission opportunity:
randomly select the time and frequency resources for the other transmission opportunity of SCI and SL-SCH corresponding to additional transmission of the MAC PDU from the available resources, according to the amount of selected frequency resources. The random function shall be such that each of the allowed selections can be chosen with equal probability;
else, if transmission based on sensing or partial sensing is configured by upper layers and there are available resources left in the resources indicated by the physical layer that meet the conditions in subcause 14.1.1.7 of [2] for one more transmission opportunity:
randomly select the time and frequency resources for the other transmission opportunity of SCI and SL-SCH corresponding to additional transmission of the MAC PDU from the available resources, according to the amount of selected frequency resources. The random function shall be such that each of the allowed selections can be chosen with equal probability;
consider a transmission opportunity which comes first in time as the new transmission opportunity and a transmission opportunity which comes later in time as the retransmission opportunity;
consider both of the transmission opportunities as the selected sidelink grant;
else:
consider the transmission opportunity as the selected sidelink grant;
use the selected sidelink grant to determine the subframes in which transmission(s) of SCI and SL-SCH occur according to subclause 14.2.1 and 14.1.1.4B of [2];

consider the selected sidelink grant to be a configured sidelink grant.

NOTE: For V2X sidelink communication, the UE should ensure the randomly selected time and frequency resources fulfill the latency requirement.

NOTE: For V2X sidelink communication, when there is no overlapping between the chosen configuration(s) in pssch-TxConfigList and chosen configuration(s) indicated in cbr-pssch-TxConfigList, it is up to UE implementation whether the UE transmits and which transmitting parameters the UE uses between allowed configuration(s) indicated in pssch-TxConfigList and allowed configuration(s) indicated in cbr-pssch-TxConfigList.

The MAC entity shall for each subframe:

if the MAC entity has a configured sidelink grant occurring in this subframe:
  if SL_RESOURCE_RESELECTION_COUNTER=1 and the MAC entity randomly selected, with equal probability, a value in the interval [0, 1] which is above the probability configured by upper layers in probResourceKeep:
    set the resource reservation interval equal to 0;
  if the configured sidelink grant corresponds to transmission of SCI:
    for V2X sidelink communication in UE autonomous resource selection:
    select a MCS which is, if configured, within the range that is configured by upper layers between minMCS-PSSCH and maxMCS-PSSCH included in pssch-TxConfigList and, if configured by upper layers, overlapped between minMCS-PSSCH and maxMCS-PSSCH indicated in cbr-pssch-TxConfigList for the highest priority of the sidelink logical channel(s) in the MAC PDU and the CBR measured by lower layers according to [6] if CBR measurement results are available or the corresponding defaultTxConfigIndex configured by upper layers if CBR measurement results are not available;

NOTE: MCS selection is up to UE implementation if the MCS or the corresponding range is not configured by upper layers.

NOTE: For V2X sidelink communication, when there is no overlapping between the chosen configuration(s) included in pssch-TxConfigList and chosen configuration(s) indicated in cbr-pssch-TxConfigList, it is up to UE implementation whether the UE transmits and which transmitting parameters the UE uses between allowed configuration(s) indicated in pssch-TxConfigList and allowed configuration(s) indicated in cbr-pssch-TxConfigList.

for V2X sidelink communication in scheduled resource allocation:
    select a MCS unless it is configured by upper layer;
    instruct the physical layer to transmit SCI corresponding to the configured sidelink grant;
    for V2X sidelink communication, deliver the configured sidelink grant, the associated HARQ information and the value of the highest priority of the sidelink logical channel(s) in the MAC PDU to the Sidelink HARQ Entity for this subframe;
  else if the configured sidelink grant corresponds to transmission of first transport block for sidelink communication:
    deliver the configured sidelink grant and the associated HARQ information to the Sidelink HARQ Entity for this subframe.

NOTE: If the MAC entity has multiple configured grants occurring in one subframe and if not all of them can be processed due to the single-cluster SC-FDM restriction, it is left for UE implementation which one of these to process according to the procedure above.

5.14.1.4 Buffer Status Reporting

The sidelink Buffer Status reporting procedure is used to provide the serving eNB with information about the amount of sidelink data available for transmission in the SL buffers associated with the MAC entity. RRC controls BSR reporting for the sidelink by configuring the two timers periodic-BSR-TimerSL and retx-BSR-TimerSL. Each sidelink logical channel belongs to a ProSe Destination. Each sidelink logical channel is allocated to an LCG depending on the priority and optionally the PPPR of the sidelink logical channel, and the mapping between LCG ID and priority and optionally the mapping between LCG ID and PPPR which are provided by upper layers in logicalChGroupInfoList [8]. LCG is defined per ProSe Destination.

A sidelink Buffer Status Report (BSR) shall be triggered if any of the following events occur:

if the MAC entity has a configured SL-RNTI or a configured SL-V-RNTI:
  SL data, for a sidelink logical channel of a ProSe Destination, becomes available for transmission in the RLC entity or in the PDCP entity (the definition of what data shall be considered as available for transmission is specified in [3] and [4] respectively) and either the data belongs to a sidelink logical channel with higher priority than the priorities of the sidelink logical channels which belong to any LCG belonging to the same ProSe Destination and for which data is already available for transmission, or there is currently no data available for transmission for any of the sidelink logical channels belonging to the same ProSe Destination, in which case the Sidelink BSR is referred below to as "Regular Sidelink BSR";
  UL resources are allocated and number of padding bits remaining after a Padding BSR has been triggered is equal to or larger than the size of the Sidelink BSR MAC control element containing the buffer status for at least one LCG of a ProSe Destination plus its subheader, in which case the Sidelink BSR is referred below to as "Padding Sidelink BSR";
  retx-BSR-TimerSL expires and the MAC entity has data available for transmission for any of the sidelink logical channels, in which case the Sidelink BSR is referred below to as "Regular Sidelink BSR";
  periodic-BSR-TimerSL expires, in which case the Sidelink BSR is referred below to as "Periodic Sidelink BSR";
else:
  An SL-RNTI or an SL-V-RNTI is configured by upper layers and SL data is available for transmission in the RLC entity or in the PDCP entity (the definition of what data shall be considered as available for transmission is specified in [3] and [4] respectively), in which case the Sidelink BSR is referred below to as "Regular Sidelink BSR".

For Regular and Periodic Sidelink BSR:
  if the number of bits in the UL grant is equal to or larger than the size of a Sidelink BSR containing buffer status for all LCGs having data available for transmission plus its subheader:
    report Sidelink BSR containing buffer status for all LCGs having data available for transmission;
  else report Truncated Sidelink BSR containing buffer status for as many LCGs having data available for transmission as possible, taking the number of bits in the UL grant into consideration.
For Padding Sidelink BSR:
  if the number of padding bits remaining after a Padding BSR has been triggered is equal to or larger than the size of a Sidelink BSR containing buffer status for all LCGs having data available for transmission plus its subheader:
    report Sidelink BSR containing buffer status for all LCGs having data available for transmission;
  else report Truncated Sidelink BSR containing buffer status for as many LCGs having data available for transmission as possible, taking the number of bits in the UL grant into consideration.
If the Buffer Status reporting procedure determines that at least one Sidelink BSR has been triggered and not cancelled:
  if the MAC entity has UL resources allocated for new transmission for this TTI and the allocated UL resources can accommodate a Sidelink BSR MAC control element plus its subheader as a result of logical channel prioritization:
    instruct the Multiplexing and Assembly procedure to generate the Sidelink BSR MAC control element(s);
    start or restart periodic-BSR-TimerSL except when all the generated Sidelink BSRs are Truncated Sidelink BSRs;
    start or restart retx-BSR-TimerSL;
  else if a Regular Sidelink BSR has been triggered:
    if an uplink grant is not configured:
      a Scheduling Request shall be triggered.
  A MAC PDU shall contain at most one Sidelink BSR MAC control element, even when multiple events trigger a Sidelink BSR by the time a Sidelink BSR can be transmitted in which case the Regular Sidelink BSR and the Periodic Sidelink BSR shall have precedence over the padding Sidelink BSR.
  The MAC entity shall restart retx-BSR-TimerSL upon reception of an SL grant.
  All triggered regular Sidelink BSRs shall be cancelled in case the remaining configured SL grant(s) valid for this SC Period can accommodate all pending data available for transmission in sidelink communication or in case the remaining configured SL grant(s) valid can accommodate all pending data available for transmission in V2X sidelink communication. All triggered Sidelink BSRs shall be cancelled in case the MAC entity has no data available for transmission for any of the sidelink logical channels. All triggered Sidelink BSRs shall be cancelled when a Sidelink BSR (except for Truncated Sidelink BSR) is included in a MAC PDU for transmission. All triggered Sidelink BSRs shall be cancelled, and retx-BSR-TimerSL and periodic-BSR-TimerSL shall be stopped, when upper layers configure autonomous resource selection.
  The MAC entity shall transmit at most one Regular/Periodic Sidelink BSR in a TTI. If the MAC entity is requested to transmit multiple MAC PDUs in a TTI, it may include a padding Sidelink BSR in any of the MAC PDUs which do not contain a Regular/Periodic Sidelink BSR.

All Sidelink BSRs transmitted in a TTI always reflect the buffer status after all MAC PDUs have been built for this TTI. Each LCG shall report at the most one buffer status value per TTI and this value shall be reported in all Sidelink BSRs reporting buffer status for this LCG.
  NOTE: A Padding Sidelink BSR is not allowed to cancel a triggered Regular/Periodic Sidelink BSR. A Padding Sidelink BSR is triggered for a specific MAC PDU only and the trigger is cancelled when this MAC PDU has been built.

5.14.1.5 TX Carrier (Re-)Selection for V2X Sidelink Communication

The MAC entity shall consider a CBR of a carrier to be one measured by lower layers according to 3GPP TS 36.214 [6] if CBR measurement results are available, or the corresponding defaultTxConfigIndex configured by upper layers for the carrier if CBR measurement results are not available.

The MAC entity shall:
  if the MAC entity is configured by upper layers to transmit using pool(s) of resources on one or multiple carriers as indicated in subclause 5.10.13.1 of 3GPP TS 36.331 [8] and data is available in STCH (i.e. initial Tx carrier selection):
    for each sidelink logical channel where data is available:
      for each carrier configured by upper layers (3GPP TS 24.386 [15]) associated with the concerned sidelink logical channel:
        if the CBR of the carrier is below threshCBR-FreqReselection associated with the priority of the sidelink logical channel:
          consider the carrier as a candidate carrier for TX carrier (re-)selection for the concerned sidelink logical channel.
  else if the MAC entity has been configured by upper layers to transmit using pool(s) of resources on one or multiple carriers as indicated in subclause 5.10.13.1 of 3GPP TS 36.331 [8], and the TX carrier reselection is triggered for a process associated with a carrier according to sub-clause 5.14.1.1 (i.e. Tx carrier reselection):
    for each sidelink logical channel allowed on the carrier where data is available and Tx carrier (re-)selection is triggered:
      if the CBR of the carrier is below threshCBR-FreqKeeping associated with priority of sidelink logical channel:
        select the carrier and the associated pool of resources.
      else:
        for each carrier configured by upper layers, if the CBR of the carrier is below threshCBR-FreqReselection associated with the priority of the sidelink logical channel;
          consider the carrier as a candidate carrier for TX carrier (re-)selection.
The MAC entity shall:
  if one or more carriers are considered as the candidate carriers for TX carrier (re-) selection:
    for each sidelink logical channel allowed on the carrier where data is available and Tx carrier (re-)selection is triggered, select one or more carrier(s) and associated pool(s) of resources among the candidate carriers with increasing order of CBR from the lowest CBR;
      NOTE 1: It is left to UE implementation how many carriers to select based on UE capability.

NOTE 2: It is left to UE implementation to determine the sidelink logical channels for which Tx carrier (re-) selection is triggered among the sidelink logical channels allowed on the carrier.

NOTE 3: If the MAC entity is configured by the upper layer to receive a sidelink grant dynamically on the PDCCH, it is left to UE implementation to determine which carriers configured by upper layer in sl-V2X-ConfigDedicated [8] are considered as selected carriers.

6.1.3.1a Sidelink BSR MAC Control Elements

Sidelink BSR and Truncated Sidelink BSR MAC control elements consist of one Destination Index field, one LCG ID field and one corresponding Buffer Size field per reported target group.

The Sidelink BSR MAC control elements are identified by MAC PDU subheaders with LCIDs as specified in table 6.2.1-2. They have variable sizes.

For each included group, the fields are defined as follows (FIGS. 6.1.3.1a-1 and 6.1.3.1a-2): [of 3GPP TS 36.321 V15.3.0, which are reproduced as FIG. 5 and FIG. 6 respectively]):

Destination Index: The Destination Index field identifies the ProSe Destination or the destination for V2X sidelink communication. The length of this field is 4 bits. The value is set to the index of the destination reported in destinationInfoList for sidelink communication or is set to one index among index(es) associated to same destination reported in v2x-DestinationInfoList for V2X sidelink communication. If multiple such lists are reported, the value is indexed sequentially across all the lists in the same order as specified in [8];

LCG ID: The Logical Channel Group ID field identifies the group of logical channel(s) which buffer status is being reported. The length of the field is 2 bits;

Buffer Size: The Buffer Size field identifies the total amount of data available across all logical channels of a LCG of a ProSe Destination after all MAC PDUs for the TTI have been built. The amount of data is indicated in number of bytes. It shall include all data that is available for transmission in the RLC layer and in the PDCP layer; the definition of what data shall be considered as available for transmission is specified in [3] and [4] respectively. The size of the RLC and MAC headers are not considered in the buffer size computation. The length of this field is 6 bits. The values taken by the Buffer Size field are shown in Table 6.1.3.1-1;

R: Reserved bit, set to "0".

Buffer Sizes of LCGs are included in decreasing order of the highest priority of the sidelink logical channel belonging to the LCG irrespective of the value of the Destination Index field.

FIG. 6.1.3.1a-1 of 3GPP TS 36.321 V15.3.0, Entitled "Sidelink BSR and Truncated Sidelink BSR MAC Control Element for Even N", is Reproduced as FIG. 5

FIG. 6.1.3.1a-2 of 3GPP TS 36.321 V15.3.0, Entitled "Sidelink BSR and Truncated Sidelink BSR MAC Control Element for Odd N", is Reproduced as FIG. 6

[ . . . ]

6.1.6 MAC PDU (SL-SCH)

A MAC PDU consists of a MAC header, one or more MAC Service Data Units (MAC SDU), and optionally padding; as described in FIG. 6.1.6-4.

Both the MAC header and the MAC SDUs are of variable sizes.

A MAC PDU header consists of one SL-SCH subheader, one or more MAC PDU subheaders; each subheader except SL-SCH subheader corresponds to either a MAC SDU or padding.

The SL-SCH subheader consists of the seven header fields V/R/R/R/R/SRC/DST.

A MAC PDU subheader consists of the six header fields R/R/E/LCID/F/L but for the last subheader in the MAC PDU. The last subheader in the MAC PDU consists solely of the four header fields R/R/E/LCID. A MAC PDU subheader corresponding to padding consists of the four header fields R/R/E/LCID.

Figure 7:
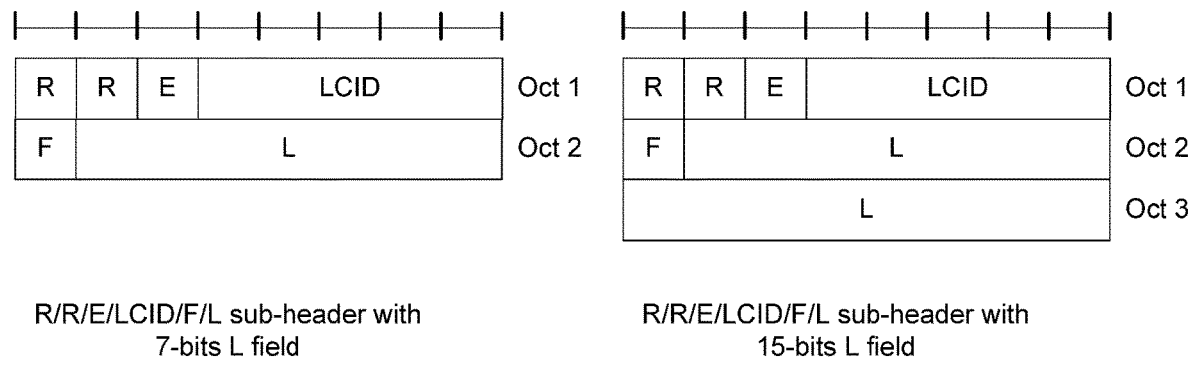
FIG. 7 is a reproduction of FIG. 6.1.6-1 of 3GPP TS 36.321 V15.3.0.

FIG. 6.1.6-1 of 3GPP TS 36.321 V15.3.0, Entitled "R/R/E/LCID/F/L MAC Subheader", is Reproduced as FIG. 7

Figure 8:
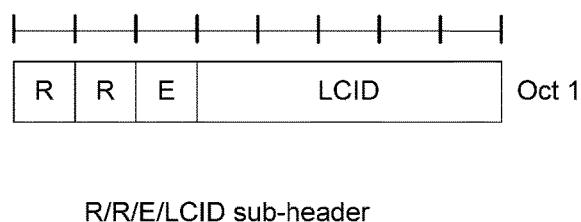
FIG. 8 is a reproduction of FIG. 6.1.6-2 of 3GPP TS 36.321 V15.3.0.

FIG. 6.1.6-2 of 3GPP TS 36.321 V15.3.0, Entitled "R/R/E/LCID MAC Subheader", is Reproduced as FIG. 8

Figure 9:
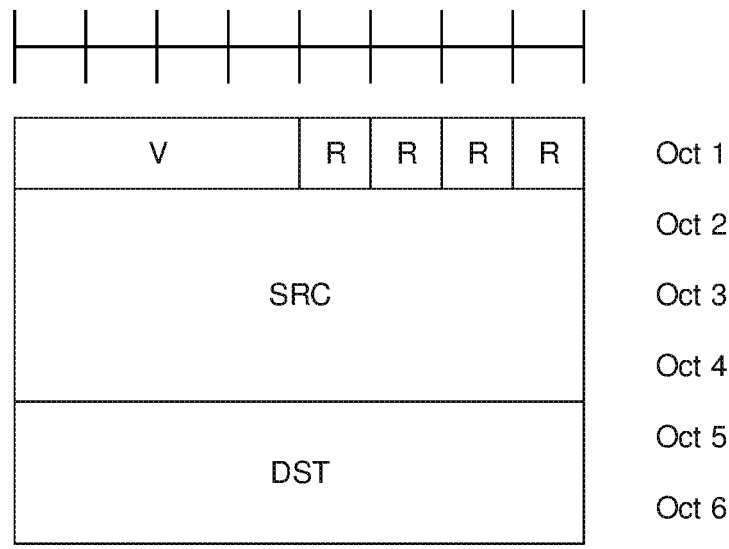
FIG. 9 is a reproduction of FIG. 6.1.6-3 of 3GPP TS 36.321 V15.3.0.

FIG. 6.1.6-3 of 3GPP TS 36.321 V15.3.0, Entitled "SL-SCH MAC Subheader for V='0001' and '0010'", is Reproduced as FIG. 9

Figure 10:
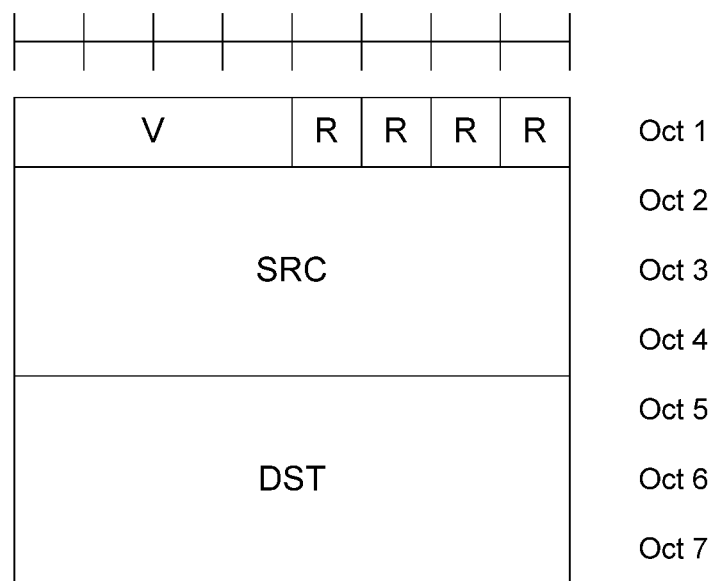
FIG. 10 is a reproduction of FIG. 6.1.6-3a of 3GPP TS 36.321 V15.3.0.

FIG. 6.1.6-3a of 3GPP TS 36.321 V15.3.0, Entitled "SL-SCH MAC Subheader for V='0011'", is Reproduced as FIG. 10

MAC PDU subheaders have the same order as the corresponding MAC SDUs and padding.

Padding occurs at the end of the MAC PDU, except when single-byte or two-byte padding is required. Padding may have any value and the MAC entity shall ignore it. When padding is performed at the end of the MAC PDU, zero or more padding bytes are allowed.

When single-byte or two-byte padding is required, one or two MAC PDU subheaders corresponding to padding are placed after the SL-SCH subheader and before any other MAC PDU subheader.

A maximum of one MAC PDU can be transmitted per TB.

Figure 11:
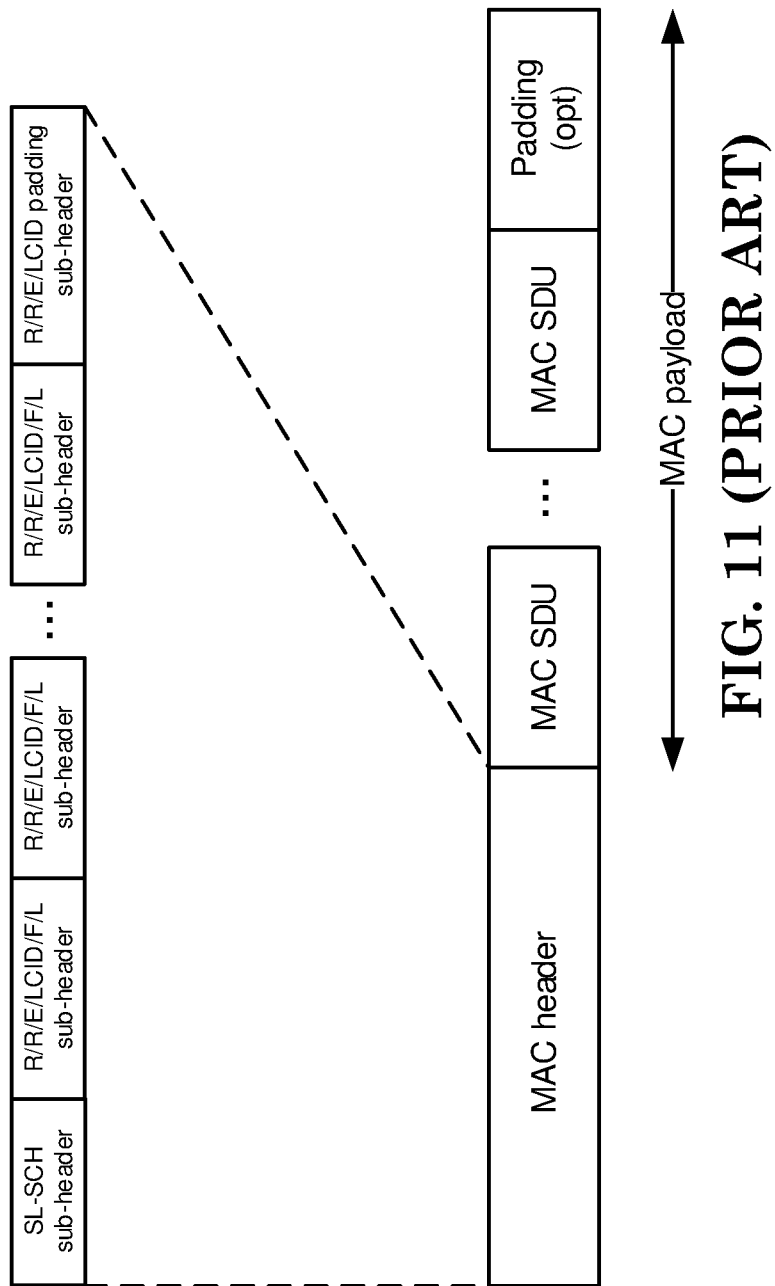
FIG. 11 is a reproduction of FIG. 6.1.6-4 of 3GPP TS 36.321 V15.3.0.

FIG. 6.1.6-4 of 3GPP TS 36.321 V15.3.0, Entitled "Example of MAC PDU Consisting of MAC Header, MAC SDUs and Padding", is Reproduced as FIG. 11

3GPP TS 36.331 V15.2.2 describes RRC procedure related to V2X sidelink communication as follows:

5.10.1d Conditions for V2X Sidelink Communication Operation

When it is specified that the UE shall perform V2X sidelink communication operation only if the conditions defined in this section are met, the UE shall perform V2X sidelink communication operation only if:

1> if the UE's serving cell is suitable (RRC_IDLE or RRC_CONNECTED); and if either the selected cell on the frequency used for V2X sidelink communication operation belongs to the registered or equivalent PLMN as specified in TS 24.334 [69] or the UE is out of coverage on the frequency used for V2X sidelink communication operation as defined in TS 36.304 [4, 11.4]; or 1> if the UE's serving cell (for RRC_IDLE or RRC_CONNECTED) fulfils the conditions to support V2X sidelink communication in limited service state as specified in TS 23.285 [78, 4.4.8]; and if either the serving cell is on the frequency used for V2X sidelink communication operation or the UE is out of coverage on the frequency used for V2X sidelink communication operation as defined in TS 36.304 [4, 11.4]; or 1> if the UE has no serving cell (RRC_IDLE);

5.10.2 Sidelink UE Information 5.10.2.1 General

Figure 12:
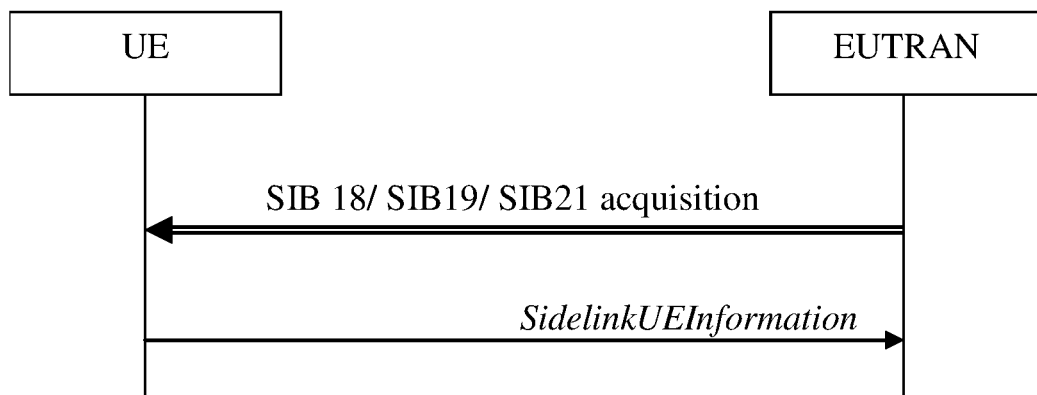
FIG. 12 is a reproduction of FIG. 5.10.2-1 of 3GPP TS 36.331 V15.2.2.

FIG. 5.10.2-1 of 3GPP TS 36.331 V15.2.2, Entitled "Sidelink UE Information", is Reproduced as FIG. 12

The purpose of this procedure is to inform E-UTRAN that the UE is interested or no longer interested to receive sidelink communication or discovery, to receive V2X sidelink communication, as well as to request assignment or release of transmission resources for sidelink communication or discovery announcements or V2X sidelink communication or sidelink discovery gaps, to report parameters related to sidelink discovery from system information of inter-frequency/PLMN cells and to report the synchronization reference used by the UE for V2X sidelink communication.

5.10.2.2 Initiation

A UE capable of sidelink communication or V2X sidelink communication or sidelink discovery that is in RRC_CONNECTED may initiate the procedure to indicate it is (interested in) receiving sidelink communication or V2X sidelink communication or sidelink discovery in several cases including upon successful connection establishment, upon change of interest, upon change to a PCell broadcasting SystemInformationBlockType18 or SystemInformationBlockType19 or SystemInformationBlockType21 including sl-V2X-ConfigCommon. A UE capable of sidelink communication or V2X sidelink communication or sidelink discovery may initiate the procedure to request assignment of dedicated resources for the concerned sidelink communication transmission or discovery announcements or V2X sidelink communication transmission or to request sidelink discovery gaps for sidelink discovery transmission or sidelink discovery reception and a UE capable of inter-frequency/PLMN sidelink discovery parameter reporting may initiate the procedure to report parameters related to sidelink discovery from system information of inter-frequency/PLMN cells.

NOTE 1: A UE in RRC_IDLE that is configured to transmit sidelink communication/V2X sidelink communication/sidelink discovery announcements, while SystemInformationBlockType18/SystemInformationBlockType19/SystemInformationBlockType21 including sl-V2X-ConfigCommon does not include the resources for transmission (in normal conditions), initiates connection establishment in accordance with 5.3.3.1a.

Upon initiating the procedure, the UE shall:
1> if SystemInformationBlockType21 including sl-V2X-ConfigCommon is broadcast by the PCell:
  2> ensure having a valid version of SystemInformationBlockType21 for the PCell;
  2> if configured by upper layers to receive V2X sidelink communication on a primary frequency or on one or more frequencies included in v2x-InterFreqInfoList, if included in SystemInformationBlockType21 of the PCell:
    3> if the UE did not transmit a SidelinkUEInformation message since last entering RRC_CONNECTED state; or
    3> if since the last time the UE transmitted a SidelinkUEInformation message the UE connected to a PCell not broadcasting SystemInformationBlockType21 including sl-V2X-ConfigCommon; or
    3> if the last transmission of the SidelinkUEInformation message did not include v2x-CommRxInterestedFreqList; or if the frequency(ies) configured by upper layers to receive V2X sidelink communication on has changed since the last transmission of the SidelinkUEInformation message:
      4> initiate transmission of the SidelinkUEInformation message to indicate the V2X sidelink communication reception frequency(ies) of interest in accordance with 5.10.2.3;
  2> else:
    3> if the last transmission of the SidelinkUEInformation message included v2x-CommRxInterestedFreqList:
      4> initiate transmission of the SidelinkUEInformation message to indicate it is no longer interested in V2X sidelink communication reception in accordance with 5.10.2.3;
  2> if configured by upper layers to transmit V2X sidelink communication on a primary frequency or on one or more frequencies included in v2x-InterFreqInfoList, if included in SystemInformationBlockType21 of the PCell:
    3> if the UE did not transmit a SidelinkUEInformation message since last entering RRC_CONNECTED state; or
    3> if since the last time the UE transmitted a SidelinkUEInformation message the UE connected to a PCell not broadcasting SystemInformationBlockType21 including sl-V2X-ConfigCommon; or
    3> if the last transmission of the SidelinkUEInformation message did not include v2x-CommTxResourceReq; or if the information carried by the v2x-CommTxResourceReq has changed since the last transmission of the SidelinkUEInformation message:
      4> initiate transmission of the SidelinkUEInformation message to indicate the V2X sidelink communication transmission resources required by the UE in accordance with 5.10.2.3;
  2> else:
    3> if the last transmission of the SidelinkUEInformation message included v2x-CommTxResourceReq:
      4> initiate transmission of the SidelinkUEInformation message to indicate it no longer requires V2X sidelink communication transmission resources in accordance with 5.10.2.3;

5.10.2.3 Actions Related to Transmission of SidelinkUEInformation Message

The UE shall set the contents of the SidelinkUEInformation message as follows:
1> if the UE initiates the procedure to indicate it is (no more) interested to receive sidelink communication or discovery or receive V2X sidelink communication or to request (configuration/release) of sidelink communication or V2X sidelink communication or sidelink discovery transmission resources (i.e. UE includes all concerned information, irrespective of what triggered the procedure):
  2> if SystemInformationBlockType21 is broadcast by the PCell and SystemInformationBlockType21 includes sl-V2X-ConfigCommon:
    3> if configured by upper layers to receive V2X sidelink communication:
      4> include v2x-CommRxInterestedFreqList and set it to the frequency(ies) for V2X sidelink communication reception;
    3> if configured by upper layers to transmit V2X sidelink communication:
      4> if configured by upper layers to transmit P2X related V2X sidelink communication:
        5> include p2x-CommTxType set to true;
      4> include v2x-CommTxResourceReq and set its fields as follows for each frequency on which the UE is configured for V2X sidelink communication transmission:
        5> set carrierFreqCommTx to indicate the frequency for V2X sidelink communication transmission;
        5> set v2x-TypeTxSync to the current synchronization reference type used on the associated carrierFreqCommTx for V2X sidelink communication transmission;
        5> set v2x-DestinationInfoList to include the V2X sidelink communication transmission destination(s) for which it requests E-UTRAN to assign dedicated resources;
1> else if the UE initiates the procedure to request sidelink discovery transmission and/or reception gaps:
  2> if the UE is configured with gapRequestsAllowedDedicated set to true; or
  2> if the UE is not configured with gapRequestsAllowedDedicated and gapRequestsAllowedCommon is included in SystemInformationBlockType19:
    3> if the UE requires sidelink discovery gaps to monitor the sidelink discovery announcements the UE is configured to monitor by upper layers:
      4> include discRxGapReq and set it to indicate, for each frequency that either concerns the primary frequency or is included in discInterFreqList on which the UE is configured to monitor sidelink discovery announcements and for which it requires sidelink discovery gaps to do so, the gap pattern(s) as well as the concerned frequency, if different from the primary;
    3> if the UE requires sidelink discovery gaps to transmit the sidelink discovery announcements the UE is configured to transmit by upper layers:
      4> include discTxGapReq and set it to indicate, for each frequency that either concerns the primary or is included in discInterFreqList on which the UE is configured to transmit sidelink discovery announcements and for which it requires sidelink discovery gaps to do so, the gap pattern(s) as well as the concerned frequency, if different from the primary;
1> else if the UE initiates the procedure to report the system information parameters related to sidelink discovery of carriers other than the primary:
  2> include discSysInfoReportFreqList and set it to report the system information parameter acquired from the cells on those carriers;
The UE shall submit the SidelinkUEInformation message to lower layers for transmission.
[ . . . ]

5.10.13 V2X Sidelink Communication Transmission

5.10.13.1 Transmission of V2X Sidelink Communication

A UE capable of V2X sidelink communication that is configured by upper layers to transmit V2X sidelink communication and has related data to be transmitted shall:
1> if the conditions for sidelink operation as defined in 5.10.1d are met:
  2> if in coverage on the frequency used for V2X sidelink communication as defined in TS 36.304 [4, 11.4]; or
  2> if the frequency used to transmit V2X sidelink communication is included in v2x-InterFreqInfoList in RRCConnectionReconfiguration or in v2x-InterFreqInfoList within SystemInformationBlockType21:
    3> if the UE is in RRC_CONNECTED and uses the PCell or the frequency included in v2x-InterFreqInfoList in RRCConnectionReconfiguration for V2X sidelink communication:
      4> if the UE is configured, by the current PCell with commTxResources set to scheduled:
        5> if T310 or T311 is running; and if the PCell at which the UE detected physical layer problems or radio link failure broadcasts SystemInformationBlockType21 including v2x-CommTxPoolExceptional in sl-V2X-ConfigCommon, or v2x-CommTxPoolExceptional is included in v2x-InterFreqInfoList for the concerned frequency in SystemInformationBlockType21 or RRCConnectionReconfiguration; or
        5> if T301 is running and the cell on which the UE initiated connection re-establishment broadcasts SystemInformationBlockType21 including v2x-CommTxPoolExceptional in sl-V2X-ConfigCommon, or v2x-CommTxPoolExceptional is included in v2x-InterFreqInfoList for the concerned frequency in SystemInformationBlockType21; or
        5> if T304 is running and the UE is configured with v2x-CommTxPoolExceptional included in mobilityControlInfoV2X in RRCConnectionReconfiguration or in v2x-InterFreqInfoList for the concerned frequency in RRCConnectionReconfiguration:
          6> configure lower layers to transmit the sidelink control information and the corresponding data based on random selection using the pool of resources indicated by v2x-CommTxPoolExceptional as defined in TS 36.321 [6];
        5> else:

6> configure lower layers to request E-UTRAN to assign transmission resources for V2X sidelink communication;
4> else if the UE is configured with v2x-CommTxPoolNormalDedicated or v2x-CommTxPoolNormal or p2x-CommTxPoolNormal in the entry of v2x-InterFreqInfoList for the concerned frequency in sl-V2X-ConfigDedicated in RRCConnectionReconfiguration:
5> if the UE is configured to transmit non-P2X related V2X sidelink communication and a result of sensing on the resources configured in v2x-Comm TxPoolNormalDedicated or v2x-CommTxPoolNormal in the entry of v2x-InterFreqInfoList for the concerned frequency in RRCConnectionReconfiguration is not available in accordance with TS 36.213 [23]; or
5> if the UE is configured to transmit P2X related V2X sidelink communication and selects to use partial sensing according to 5.10.13.1a, and a result of partial sensing on the resources configured in v2x-Comm TxPoolNormalDedicated or p2x-CommTxPoolNormal in the entry of v2x-InterFreqInfoList for the concerned frequency in RRCConnectionReconfiguration is not available in accordance with TS 36.213 [23]:
6> if v2x-CommTxPoolExceptional is included in mobilityControlInfoV2X in RRCConnectionReconfiguration (i.e., handover case); or
6> if v2x-CommTxPoolExceptional is included in the entry of v2x-InterFreqInfoList for the concerned frequency in RRCConnectionReconfiguration; or
6> if the PCell broadcasts SystemInformationBlockType21 including v2x-Comm TxPoolExceptional in sl-V2X-ConfigCommon or v2x-Comm TxPoolExceptional in v2x-InterFreqInfoList for the concerned frequency:
7> configure lower layers to transmit the sidelink control information and the corresponding data based on random selection using the pool of resources indicated by v2x-CommTxPoolExceptional as defined in TS 36.321 [6];
5> else if the UE is configured to transmit P2X related V2X sidelink communication:
6> select a resource pool according to 5.10.13.2;
6> perform P2X related V2X sidelink communication according to 5.10.13.1a;
5> else if the UE is configured to transmit non-P2X related V2X sidelink communication:
6> configure lower layers to transmit the sidelink control information and the corresponding data based on sensing (as defined in TS 36.321 [6] and TS 36.213 [23]) using one of the resource pools indicated by v2x-commTxPoolNormalDedicated or v2x-CommTxPoolNormal in the entry of v2x-InterFreqInfoList for the concerned frequency, which is selected according to 5.10.13.2;
3> else:
4> if the cell chosen for V2X sidelink communication transmission broadcasts SystemInformationBlockType21:
5> if the UE is configured to transmit non-P2X related V2X sidelink communication, and if SystemInformationBlockType21 includes v2x-Comm TxPoolNormalCommon or v2x-CommTxPoolNormal in v2x-InterFreqInfoList for the concerned frequency in sl-V2X-Config-Common and a result of sensing on the resources configured in v2x-Comm TxPoolNormalCommon or v2x-CommTxPoolNormal in v2x-InterFreqInfoList for the concerned frequency is available in accordance with TS 36.213 [23]:
6> configure lower layers to transmit the sidelink control information and the corresponding data based on sensing (as defined in TS 36.321 [6] and TS 36.213 [23]) using one of the resource pools indicated by v2x-CommTxPoolNormalCommon or v2x-CommTxPoolNormal in v2x-InterFreqInfoList for the concerned frequency, which is selected according to 5.10.13.2;
5> else if the UE is configured to transmit P2X related V2X sidelink communication, and if SystemInformationBlockType21 includes p2x-Comm TxPoolNormalCommon or p2x-CommTxPoolNormal in v2x-InterFreqInfoList for the concerned frequency in sl-V2X-Config-Common, and if the UE selects to use random selection according to 5.10.13.1a, or selects to use partial sensing according to 5.10.13.1a and a result of partial sensing on the resources configured in p2x-CommTxPoolNormalCommon or p2x-CommTxPoolNormal in v2x-InterFreqInfoList for the concerned frequency is available in accordance with TS 36.213 [23]:
6> select a resource pool from p2x-CommTxPoolNormalCommon or p2x-CommTxPoolNormal in v2x-InterFreqInfoList for the concerned frequency according to 5.10.13.2, but ignoring zoneConfig in SystemInformationBlockType21;
6> perform P2X related V2X sidelink communication according to 5.10.13.1a;
5> else if SystemInformationBlockType21 includes v2x-CommTxPoolExceptional in sl-V2X-ConfigCommon or v2x-Comm TxPoolExceptional in v2x-InterFreqInfoList for the concerned frequency:
6> from the moment the UE initiates connection establishment until receiving an RRCConnectionReconfiguration including sl-V2X-ConfigDedicated, or until receiving an RRCConnectionRelease or an RRCConnectionReject; or
6> if the UE is in RRC_IDLE and a result of sensing on the resources configured in v2x-Comm TxPoolNormalCommon or v2x-CommTxPoolNormal in v2x-InterFreqInfoList for the concerned frequency in Systeminformationblocktype21 is not available in accordance with TS 36.213 [23]; or
6> if the UE is in RRC_IDLE and UE selects to use partial sensing according to 5.10.13.1a and a result of partial sensing on the resources configured in p2x-CommTxPoolNormalCommon or p2x-CommTxPoolNormal in v2x-InterFreqInfoList for the concerned frequency in Systeminformationblocktype21 is not available in accordance with TS 36.213 [23]:

7> configure lower layers to transmit the sidelink control information and the corresponding data based on random selection (as defined in TS 36.321 [6]) using the pool of resources indicated in v2x-Comm TxPoolExceptional;
2> else:
3> configure lower layers to transmit the sidelink control information and the corresponding data based on sensing (as defined in TS 36.321 [6] and TS 36.213 [23]) using one of the resource pools indicated by v2x-CommTxPoolList in SL-V2X-Preconfiguration in case of non-P2X related V2X sidelink communication, which is selected according to 5.10.13.2, or using one of the resource pools indicated by p2x-CommTxPoolList in SL-V2X-Preconfiguration in case of P2X related V2X sidelink communication, which is selected according to 5.10.13.2, and in accordance with the timing of the selected reference as defined in 5.10.8;

The UE capable of non-P2X related V2X sidelink communication that is configured by upper layers to transmit V2X sidelink communication shall perform sensing on all pools of resources which may be used for transmission of the sidelink control information and the corresponding data. The pools of resources are indicated by SL-V2X-Preconfiguration, v2x-CommTxPoolNormalCommon, v2x-CommTxPoolNormalDedicated in sl-V2X-ConfigDedicated, or v2x-CommTxPoolNormal in v2x-InterFreqInfoList for the concerned frequency, as configured above.

NOTE 1: If there are multiple frequencies for which normal or exceptional pools are configured, it is up to UE implementation which frequency is selected for V2X sidelink communication transmission.

5.10.13.2 V2X Sidelink Communication Transmission Pool Selection

For a frequency used for V2X sidelink communication, if zoneConfig is not ignored as specified in 5.10.13.1, the UE configured by upper layers for V2X sidelink communication shall only use the pool which corresponds to geographical coordinates of the UE, if zoneConfig is included in SystemInformationBlockType21 of the serving cell (RRC_IDLE)/PCell (RRC_CONNECTED) or in RRCConnectionReconfiguration for the concerned frequency, and the UE is configured to use resource pools provided by RRC signalling for the concerned frequency; or if zoneConfig is included in SL-V2X-Preconfiguration for the concerned frequency, and the UE is configured to use resource pools in SL-V2X-Preconfiguration for the frequency, according to 5.10.13.1. The UE shall only use the pool which is associated with the synchronization reference source selected in accordance with 5.10.8.2.

1> if the UE is configured to transmit on p2x-CommTxPoolNormalCommon or on p2x-CommTxPoolNormal in v2x-InterFreqInfoList in SystemInformationBlockType21 according to 5.10.13.1; or
1> if the UE is configured to transmit on p2x-CommTxPoolList-r14 in SL-V2X-Preconfiguration according to 5.10.13.1; or
1> if zoneConfig is not included in SystemInformationBlockType21 and the UE is configured to transmit on v2x-CommTxPoolNormalCommon or v2x-Comm TxPoolNormalDedicated; or
1> if zoneConfig is included in SystemInformationBlockType21 and the UE is configured to transmit on v2x-CommTxPoolNormalDedicated for P2X related V2X sidelink communication and zoneID is not included in v2x-CommTxPoolNormalDedicated; or
1> if zoneConfig is not included in the entry of v2x-InterFreqInfoList for the concerned frequency and the UE is configured to transmit on v2x-CommTxPoolNormal in v2x-InterFreqInfoList or p2x-CommTxPoolNormal in v2x-InterFreqInfoList in RRCConnectionReconfiguration; or
1> if zoneConfig is not included in SL-V2X-Preconfiguration for the concerned frequency and the UE is configured to transmit on v2x-CommTxPoolList in SL-V2X-Preconfiguration for the concerned frequency:
2> select the first pool associated with the synchronization reference source selected in accordance with 5.10.8.2;
1> if zoneConfig is included in SystemInformationBlockType21 and the UE is configured to transmit on v2x-CommTxPoolNormalCommon or v2x-Comm TxPoolNormalDedicated for non-P2X related V2X sidelink communication; or
1> if zoneConfig is included in SystemInformationBlockType21 and the UE is configured to transmit on v2x-CommTxPoolNormalDedicated for P2X related V2X sidelink communication and zoneID is included in v2x-CommTxPoolNormalDedicated; or
1> if zoneConfig is included in the entry of v2x-InterFreqInfoList for the concerned frequency and the UE is configured to transmit on v2x-CommTxPoolNormal in v2x-InterFreqInfoList or p2x-CommTxPoolNormal in v2x-InterFreqInfoList in RRCConnectionReconfiguration; or
1> if zoneConfig is included in SL-V2X-Preconfiguration for the concerned frequency and the UE is configured to transmit on v2x-CommTxPoolList in SL-V2X-Preconfiguration for the concerned frequency:
2> select the pool configured with zoneID equal to the zone identity determined below and associated with the synchronization reference source selected in accordance with 5.10.8.2;

The UE shall determine an identity of the zone (i.e. Zone_id) in which it is located using the following formulae, if zoneConfig is included in SystemInformationBlockType21 or in SL-V2X-Preconfiguration:

$x_1 = \text{Floor}(x/L) \bmod Nx;$ $y_1 = \text{Floor}(y/W) \bmod Ny;$ $\text{Zone\_id} = y_1 * Nx + x_1.$ The parameters in the formulae are defined as follows:
L is the value of zoneLength included in zoneConfig in SystemInformationBlockType21 or in SL-V2X-Preconfiguration;
W is the value of zoneWidth included in zoneConfig in SystemInformationBlockType21 or in SL-V2X-Preconfiguration;
Nx is the value of zoneIdLongiMod included in zoneConfig in SystemInformationBlockType21 or in SL-V2X-Preconfiguration;
Ny is the value of zoneIdLatiMod included in zoneConfig in SystemInformationBlockType21 or in SL-V2X-Preconfiguration;
x is the geodesic distance in longitude between UE's current location and geographical coordinates (0, 0) according to WGS84 model [80] and it is expressed in meters;

y is the geodesic distance in latitude between UE's current location and geographical coordinates (0, 0) according to WGS84 model [80] and it is expressed in meters.

The UE shall select a pool of resources which includes a zoneID equals to the Zone_id calculated according to above mentioned formulae and indicated by v2x-CommTxPool-NormalDedicated, v2x-CommTxPoolNormalCommon, v2x-CommTxPoolNormal in v2x-InterFreqInfoList or p2x-CommTxPoolNormal in v2x-InterFreqInfoList in RRCConnectionReconfiguration, or v2x-CommTxPoolList according to 5.10.13.1.

NOTE 1: The UE uses its latest geographical coordinates to perform resource pool selection.

NOTE 2: If geographical coordinates are not available and zone specific TX resource pools are configured for the concerned frequency, it is up to UE implementation which resource pool is selected for V2X sidelink communication transmission.

In the RAN1#94 Chairman's Note, the agreements of NR V2X are described as follows:

Agreements:

1 At least two sidelink resource allocation modes are defined for NR-V2X sidelink communication Mode 1: Base station schedules sidelink resource(s) to be used by UE for sidelink transmission(s)

Mode 2: UE determines (i.e. base station does not schedule) sidelink transmission resource(s) within sidelink resources configured by base station/network or pre-configured sidelink resources Notes:

eNB control of NR sidelink and gNB control of LTE sidelink resources will be separately considered in corresponding agenda items.

Mode-2 definition covers potential sidelink radio-layer functionality or resource allocation sub-modes (subject to further refinement including merging of some or all of them) where a) UE autonomously selects sidelink resource for transmission b) UE assists sidelink resource selection for other UE(s)

c) UE is configured with NR configured grant (type-1 like) for sidelink transmission d) UE schedules sidelink transmissions of other UEs 2 RAN1 to continue study details of resource allocation modes for NR-V2X sidelink communication One or multiple of following terminologies may be used hereafter:

BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.

TRP: A transmission and reception point provides network coverage and directly communicates with UEs. TRP could also be referred to as distributed unit (DU) or network node.

Cell: A cell is composed of one or multiple associated TRPs, i.e. coverage of the cell is composed of coverage of all associated TRP(s). One cell is controlled by one BS. Cell could also be referred to as TRP group (TRPG).

One or multiple of following assumptions for network side may be used hereafter:

Downlink timing of TRPs in the same cell are synchronized.

RRC layer of network side is in BS.

One or multiple of following assumptions for UE side may be used hereafter:

There are at least two UE (RRC) states: connected state (or called active state) and non-connected state (or called inactive state or idle state). Inactive state may be an additional state or belong to connected state or non-connected state.

Figure 13:
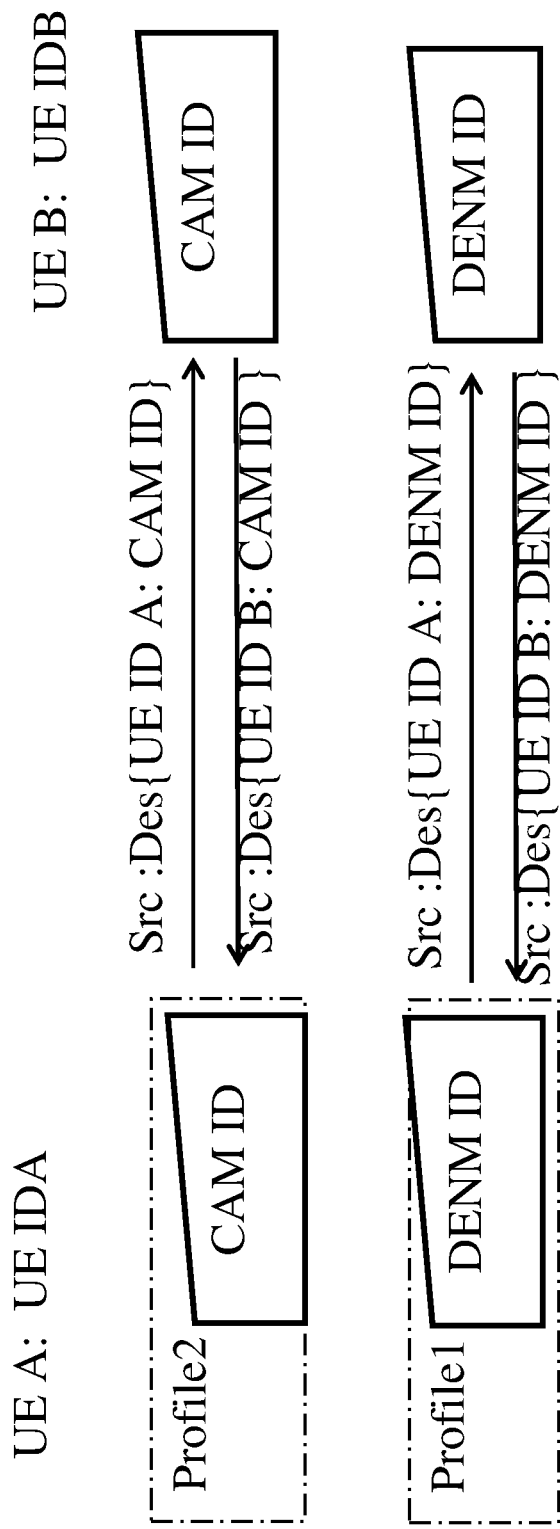
FIG. 13 is a diagram according to one exemplary embodiment.

In LTE V2X (Vehicle-to-Everything), a Tx profile is used by the upper layers to select between R14 or R15 transmission format in AS (Access Stratum) layer. Given mapping between V2X service identifiers and Tx profiles, the upper layer determines the Tx profile to use for transmitting a packet based on the V2X service identifier (e.g. PSID (Provider Service Identifier) or ITS-AID (ITS Application Identifier) of the V2X application) and then provides the Tx profile to the AS with the packet. Besides, since each service is associated with a specific destination layer-2 ID for one-to-many communication, the Tx profile may be provided with the destination layer-2 ID associated with the V2X service to AS layer. And, AS layer may then determine transmission format for a packet just based on the destination layer-2 ID associated with the packet. The concept is shown in FIG. 13, which illustrates an exemplary embodiment for transmission profile applied on one-to-many communication. In case of network scheduled operation mode, eNB can schedule the UE based on SL BSR which includes the destination index associated with data in the buffer.

Figure 14:
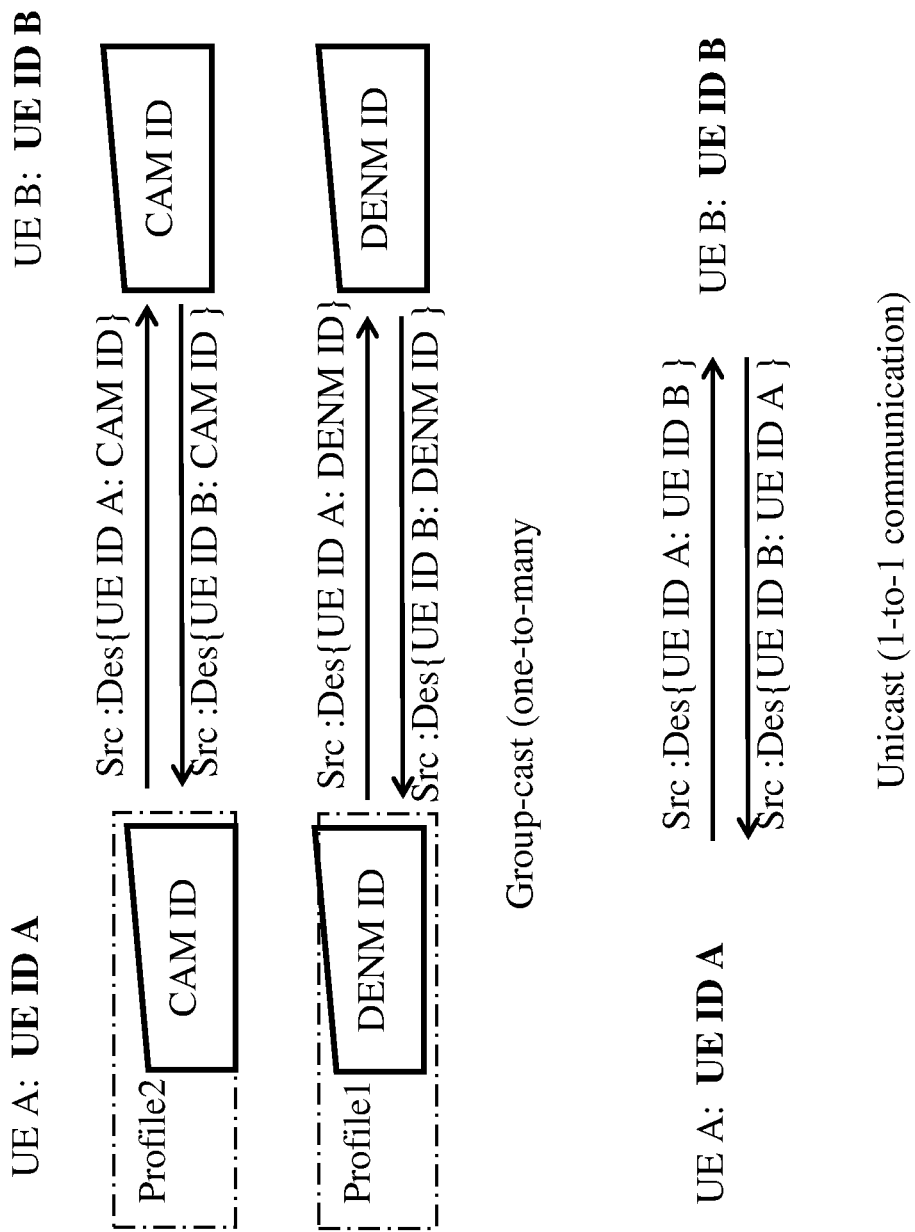
FIG. 14 is a diagram according to one exemplary embodiment.

On the other hand, in scope of NR V2X study, there is also a need to study one-to-one communication in addition to one-to-many communication. In LTE V2X, a UE will be self-allocated with an UE ID for representing itself. The UE will use the UE ID as source layer-2 ID in any one-to-many communication for other UEs to differentiate different communications. Regarding the one-to-one communication (i.e. Unicast), it is straightforward to reuse the UE ID as a source layer-2 ID in unicast for other UEs to differentiate different communications. And a destination of a one-to-one communication will be another UE ID belonging to another UE. The assumption is shown in FIG. 14.

Based on the assumption, since the UE ID self-allocated within each UE is just for identifying itself and thus destination ID of a UE is not intrinsically mapped to a specific V2X service, the one-to-one communication of different services cannot be differentiated by destination ID of a UE. As a consequence, one-to-one communication of different services could not be served by different AS parameters (e.g. MCS, transmission format, SCS, TBS) as V2X in LTE. Similarly, the one-to-one communication of different services also cannot be served by different RATs. In case of network scheduled operation mode, eNB will not be able to schedule the UE based on SL BSR because the association between the destination index or layer-2 ID and Tx profile does not exist.

Considering supporting different RATs case, some possible solutions for RAT differentiation are discussed below.

Solution 1: Allocate a UE with Multiple UE IDs for One-to-One Communication. And Different UE IDs Will be Associated with Different RATs.

In this method, a UE could be allocated with different UE IDs for different RATs. The UE IDs will be used as source layer-2 IDs for performing sidelink transmissions for corresponding services. In one embodiment, a UE could be based on the different UE IDs for receiving data from different RATs. The different UE IDs may be allocated for one-to-one communications. The UE IDs could be self-allocated. Alternatively, the UE IDs could be network allocated.

The association between the UE IDs and RATs could be determined based on transmission profile(s). For example, a service is associated with a transmission profile. And the transmission profile could indicate appropriate RAT for one-to-one communication of the service. The UE could link the one-to-one communication of the service to a UE ID for one-to-one communication in corresponding RAT.

For mode 1, the UE may need to separately report resource demands of different RATs. One possible way is to report resource demand in per destination way in a MAC CE. Another possible way is to report resource demand in per source-destination pair way in a MAC CE. Another possible way is to report resource demand in different MAC CEs for different RATs. The different MAC CEs will be identified by different MAC subheaders. Another possible way is to include a new field for indicating RAT difference of each buffer size.

For mode 2, the UE could select resource from which RAT for transmitting a data of a service based on a transmission profile associated with the service or the UE ID (source layer-2 ID) associated with the service.

In one embodiment, the association could be established by including the UE ID (source layer-2 ID and/or destination layer-2 ID) in a transmission profile for a service. Alternatively, the association could be established by including RAT information in a transmission profile for a service. The UE IDs for one-to-one sidelink communication in different RATs could be self-allocated and/or allocated by a network (e.g. V2X server, BS, Core network, V2X control function, V2X application).

In one embodiment, the UE could report transmission profile information and/or the association to the network (e.g. base station). The UE could report at least one or multiple information listed below:
1. V2X service identity
2. Transmission profile identity
3. QoS (Quality of Service) information (e.g. 5QI value)
4. RAT (Radio Access Technology) indication
5. Source layer-2 ID
6. Destination layer-2 ID In one embodiment, the above information could be reported through a RRC (Radio Resource Control) message.

In one embodiment, the UE could include a new field in Sidelink BSR (Buffer Status Report) for indicating transmission profile of the destination or the source-destination pair. Based on the information, the base station could schedule correct sidelink resource to the UE for the destination or the source-destination pair. The new field could indicate one or multiple information listed below:
1. Transmission profile
2. Subcarrier spacing
3. Bandwidth part
4. Carrier
5. Transmission power
6. MCS
7. TB (Transport Block) size
8. RAT
9. Whether applying HARQ (Hybrid Automatic Repeat Request) feedback mechanism
10. Cast type Solution 2: Define One-to-One V2X Sidelink Communication can Only Happen in NR In this solution, the RAT selection could be predefined. The one-to-one V2X sidelink communication always performs based on resource in NR. When a UE initiates an one-to-one V2X sidelink communication, the UE could directly request or select resource in NR. In one embodiment, the UE could send a RRC message to a BS for indicating one-to-one V2X sidelink communication initiation, if the UE is in RRC CONNECTED state. The UE could send a BSR for indicating buffer sizes for one-to-one V2X sidelink communications for requesting resource from NR, if the UE is configured to perform model in NR.

In one embodiment, the resources in different RATs could be provided by the same base station. The resources in different RATs could be provided by the PCell (Primary Cell). The resources in different RATs could also be provided in different scheduling modes.

Solution 3: Provide Service Information for Network to Control

In LTE V2X, there could be a mapping between V2X services (e.g. PSID or ITS-AID of the V2X application) and Tx profiles and each V2X service is associated with a Destination Layer-2 ID. With the previous information, eNB can know the required Tx profile for scheduling the UE based on the destination index included in SL (Sidelink) BSR for one-to-many direct communication.

It is possible the above concepts may be reused for one-to-one direct communication in NR, e.g. there is also a mapping between V2X services (e.g. PSID or ITS-AID of the V2X applications) and Tx profiles and SL BSR is also formatted according to destination indexes for one-to-one direct communications. Then, what is lacking would be the association between the V2X service and the Destination Layer-2 ID/destination index for the concerned one-to-one direct communication. Therefore, the concept of this approach could be the UE provides information for gNB to associate the V2X service with the Destination Layer-2 ID or destination index for the concerned one-to-one direct communication.

Figure 16:
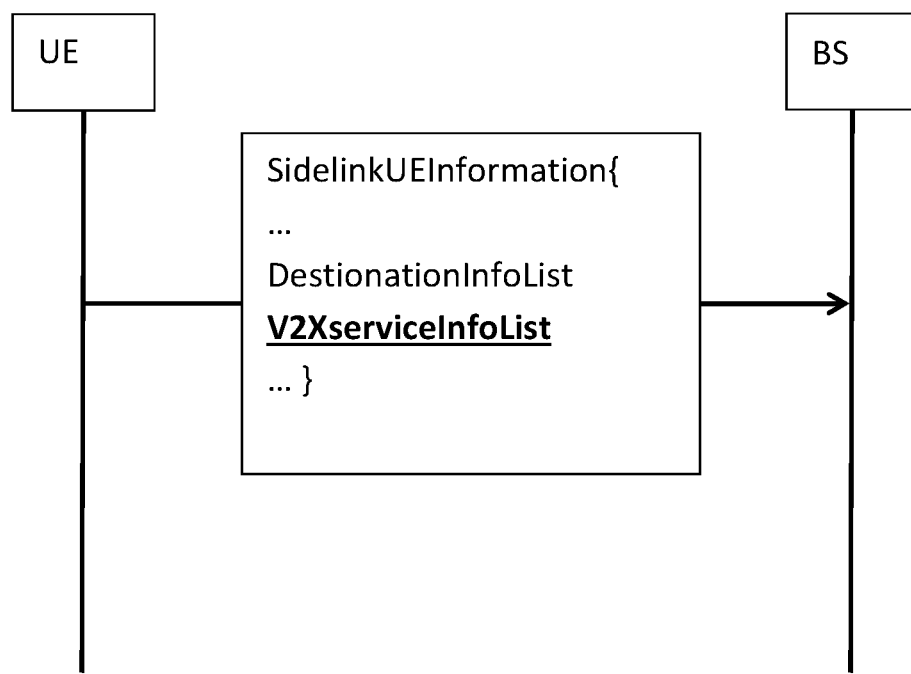
FIG. 16 is a diagram according to one exemplary embodiment.

In LTE, SidelinkUEInformation may include an IE v2x-DestinationInfoList. If the IE is also reused for the UE to request resources for NR one-to-one direct communications, V2X services corresponding to the v2x-DestinationInfoList could be included in SidelinkUEInformation for gNB to associate each V2X service with a Destination Layer-2 ID/destination index. An example is shown in FIG. 16. Alternatively, other dedicated signaling may be used to provide information for associating the V2X service with the Destination ID for the one-to-one direct communication.

In the example, the UE could send a list of destinations to a base station through a RRC message (e.g.SidelinkUEInformation). In one embodiment, different services could be associated with different destinations or different UEs. However, it is also possible that different services may be associated with the same destinations or same UEs (i.e. a one-to-one communication between the same source-destination pair may support multiple V2X services). In this situation, the v2x-DestinationInfoList may include multiple entries of the same destination ID, and thus each destination index (corresponding to one destination ID in the list) in the SL BSR can be associated with one V2X service. As a result, eNB can then determine the required Tx profile or RAT for scheduling the UE based on the destination index included in SL BSR for the one-to-one direct communication.

In one embodiment, the UE may know the association between destination and service based on configuration (e.g. NAS configuration, transmission profile). Since the base station cannot know resource type demand (e.g. resource in which RAT) of a destination, the UE may need to provide assistance information to inform the base station. In one example, the assistance information may include a V2X service information list. The list of V2X service information could be linked to the destination list (e.g. by one-to-one mapping or one-to-many mapping). The V2X service information may include one or multiple information listed below:
1. V2X service identity
2. Transmission profile identity
3. QoS information (e.g. 5QI value)
4. RAT indication
5. Service flow ID In one embodiment, a UE could send a BSR to report different buffer sizes for different destinations. And, the BSR may include a field for indicating resource demand of the corresponding buffer size. The field may indicate one or multiple information listed below:
1. Transmission profile
2. Subcarrier spacing
3. Bandwidth part
4. Carrier
5. Transmission power
6. MCS
7. TB size
8. RAT
9. Whether applying HARQ feedback mechanism
10. Cast type Considering possible different AS parameters case, it would be beneficial to support service discrimination on resource allocation of one-to-one communication. And the following possible methods are proposed for achieving the concept.

Method 1. Allocating a UE with Multiple UE IDs as Different Source IDs for Different Services (for One-to-One Communication)

In this method, a UE could be allocated with different UE IDs for different services. The UE IDs could be used as source layer-2 IDs for performing sidelink transmissions for corresponding services. In one embodiment, a UE could be based on the different UE IDs for receiving data for the different services. The different UE IDs could be allocated for one-to-one communications. The UE IDs could be self-allocated. Alternatively, the UE IDs could be network allocated.

For how UE determine transmission parameters for a service, a transmission profile could be associated with one or multiple the UE IDs. And the UE could determine transmission parameters of a sidelink transmission based on transmission profile associated with a source layer-2 ID of the sidelink transmission.

Figure 15:
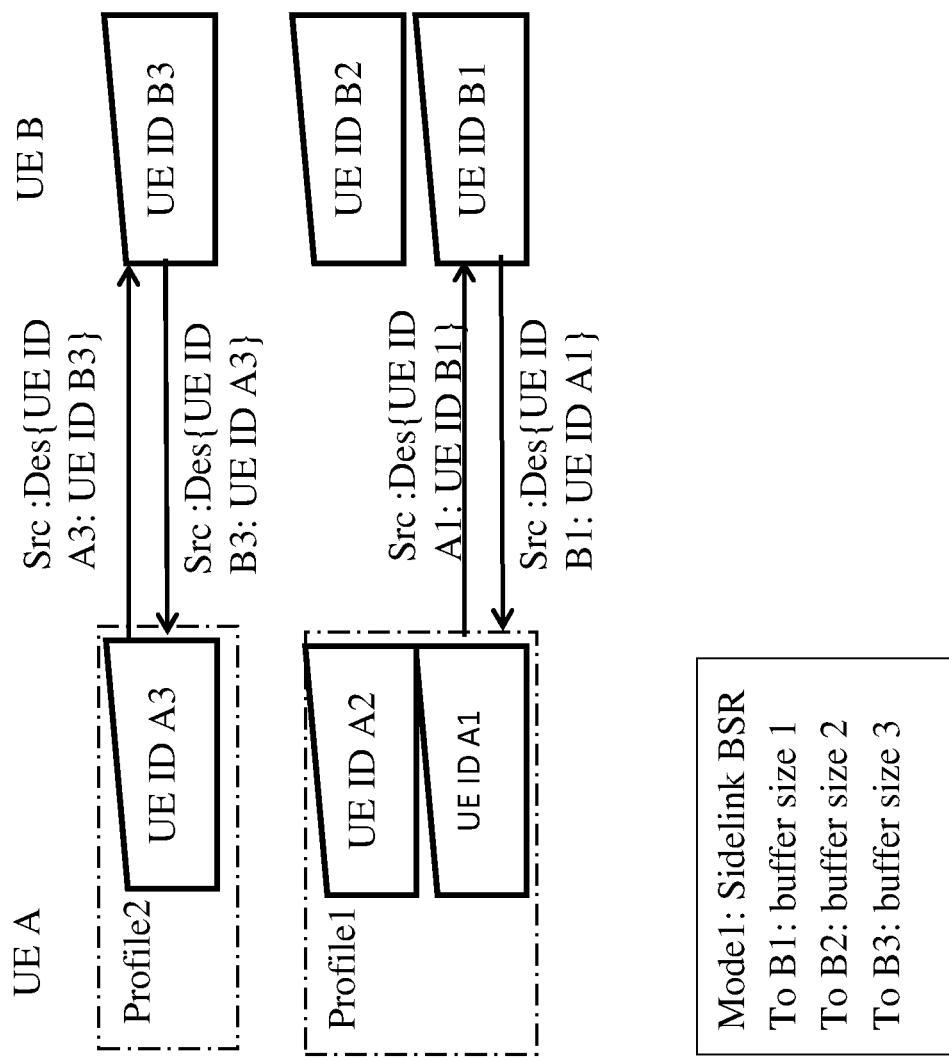
FIG. 15 is a diagram according to one exemplary embodiment.

For example, UE A will be allocated with UE ID A1, UE ID A2, and UE ID A3. UE ID A1 is associated with service1 and transmission profile 1. UE ID A2 is associated with service2 and transmission profile 1. UE ID A3 is associated with service3 and transmission profile 2. An example is shown in FIG. 15.

For mode 1, UE A may need to separately report resource demands of different transmission profiles. One possible way is to report resource demand in per destination way. Since UE ID used in one-to-one communication could be associated with service, the destination ID could also be associated with a specific service. Another possible way is to report resource demand in per source-destination pair way.

For mode 2, UE A could select resource based on a transmission profile, which is determined based on association between transmission profile and service. Specifically, UE A could select resource and/or transmission parameters based on transmission profile 1 if the UE A is going to transmit data for service 1 or service 2. And UE A could select resource and/or transmission parameters based on transmission profile 2 if UE A is going to transmit data for service 1 or service 2.

In one embodiment, the association could be established by including the UE ID (e.g. source layer-2 ID and/or destination layer-2 ID) in a transmission profile. Alternatively, the association could be established by associating both the UE ID and a transmission profile to same V2X service identity. Alternatively, the association could be established by associating both the UE ID and a transmission profile to same QoS flow or service flow.

In one embodiment, the UE could report transmission profile information and/or the association to the network (e.g. base station). The UE may report the association by transmitting a list of destinations and transmission profile related information to the network. The transmission profile related information could be one or multiple information listed below:
1. Transmission profile ID
2. Subcarrier spacing (associated with transmission profile)
3. Bandwidth part (associated with transmission profile)
4. Carrier (associated with transmission profile)
5. Transmission power (associated with transmission profile)
6. MCS
7. TB size
8. RAT
9. Whether applying HARQ feedback mechanism
10. Cast type
11. V2X service identity
12. QoS information (e.g. 5QI value)
13. Service Flow ID The transmission profile related information and the destinations could be one-to-one mapping or one-to-many mapping.

In one embodiment, the UE could include a new field in Sidelink BSR for indicating transmission profile of the destination or the source-destination pair. Based on the information, the base station could schedule correct sidelink resource to the UE for the destination or the source-destination pair. Additionally, the UE may need to send transmission profile information to the base station (through RRC message). The transmission profile information or the new field could indicate one or multiple characteristics listed below:
1. Transmission profile
2. Subcarrier spacing (associated with transmission profile or channel)
3. Bandwidth part (associated with transmission profile or channel)
4. Carrier (associated with transmission profile or channel)
5. Transmission power (associated with transmission profile or channel)
6. MCS
7. TB size
8. RAT
9. Whether applying HARQ feedback mechanism
10. Cast type Method 2. Allocating Transmission Profile to One or Multiple Channels within a Scope of a Source-Destination Pair In this method, a transmission profile could be associated with one or multiple channel(s) belonging to a source-destination pair. In one embodiment, the channel could be a sidelink logical channel, a (sidelink) radio bearer, a QoS flow, or a service flow.

Moreover, in one embodiment, the logical channel prioritization procedure could avoid MAC SDUs, from channels associated with different transmission profiles, being multiplexed within a transport block. Alternatively, the logical channel prioritization procedure could also allow MAC SDUs, from channels associated with different transmission profiles, being multiplexed within a transport block, if those transmission profiles shares at least one set of transmission parameters.

In one embodiment, the association could be established by including an ID of the channel in a transmission profile, by including source layer-2 ID in the transmission profile, or by including destination layer-2 ID in the transmission profile.

For mode 1, the UE may need to separately report resource demands of different transmission profiles. Considering the association, the UE may need to report buffer status of a destination or a source-destination pair separately based on transmission profile(s). In one embodiment, the buffer status of a destination or a source-destination pair could be reported based on one or multiple characteristics listed below:
1. Transmission profile
2. Subcarrier spacing (associated with transmission profile or channel)
3. Bandwidth part (associated with transmission profile or channel)
4. Carrier (associated with transmission profile or channel)
5. Transmission power (associated with transmission profile or channel)
6. TB size
7. MCS
8. Whether applying HARQ feedback mechanism
9. RAT
10. Cast type In one embodiment, a new field in sidelink BSR could be introduced for indicating the characteristics of a buffer size field. Alternatively, the UE could report the association between transmission profile(s) and channel(s) to a base station. And the UE could rely on the base station to configure channels with a proper LCG for BSR reporting.

For mode 2, the UE could select resource based on a transmission profile, which is determined based on association between transmission profile and service. Specifically, the UE could select resource and/or transmission parameters based on a transmission profile if the UE is going to transmit data belonging to channel associated with the transmission profile.

Method 3. Network Controls Transmission Parameters of V2X Service

In this method, when a RRC CONNECTED UE initiates one-to-one communication for a V2X service, the UE could provide information of the V2X service to a base station. The base station could provide AS layer configurations to the UE based on information of the V2X service.

In one embodiment, when a RRC IDLE UE or a RRC INACTIVE UE initiates one-to-one communication for a V2X service, the UE could apply AS layer configurations based on system information from a base station. The system information could provide a mapping between information of the V2X service and AS configuration. In one embodiment, the system information could provide AS layer configuration.

The information of the V2X service could be one or multiple candidates listed below:
1. QoS information of the V2X service (e.g. 5GI)
2. The V2X service identifier (e.g. PSID)
3. Service flow ID
4. UE ID (e.g. source layer-2 ID, application ID, destination layer-2 ID, etc.)

The AS layer configuration includes one or multiple parameters listed below:
1. SDAP configuration
2. Logical channel configuration
3. RLC mode
4. PDCP duplication
5. Subcarrier spacing
6. Bandwidth part
7. Cell limitation
8. Grant-free
9. Carrier
10. Transmission power related configuration (e.g. maximum Tx power, power adjusting scale)
11. Whether applying HARQ feedback mechanism
12. RAT
13. Cast type Regardless of any methods mentioned above, the transmission profile can indicate one or multiple AS layer transmission parameters. In one embodiment, the transmission profile could indicate one or multiple information listed below:
1. RAT
2. MCS
3. Subcarrier spacing
4. Carriers
5. Bandwidth parts
6. Transmission formats
7. Transmission power limitations
8. Transmission ranges.

Furthermore, the transmission profile could indicate HARQ adaptation, corresponding MCS, corresponding (maximum or minimum) TB size, and/or transmission mode (e.g. network scheduling mode, autonomous resource selection mode).

The new field in the BSR could be included in per LCG (Logical Channel Group) of a destination way, per buffer size way, per destination (index) way, or per source-destination way. Alternatively, the new field in the BSR could be included in per buffer size way, per MAC-subheader way, or per MAC CE way.

The allocation discussed above could be self-allocated. Alternatively, the allocation mentioned above could be network allocated (e.g. V2X control function, V2X application server, base station, core network).

Figure 17:
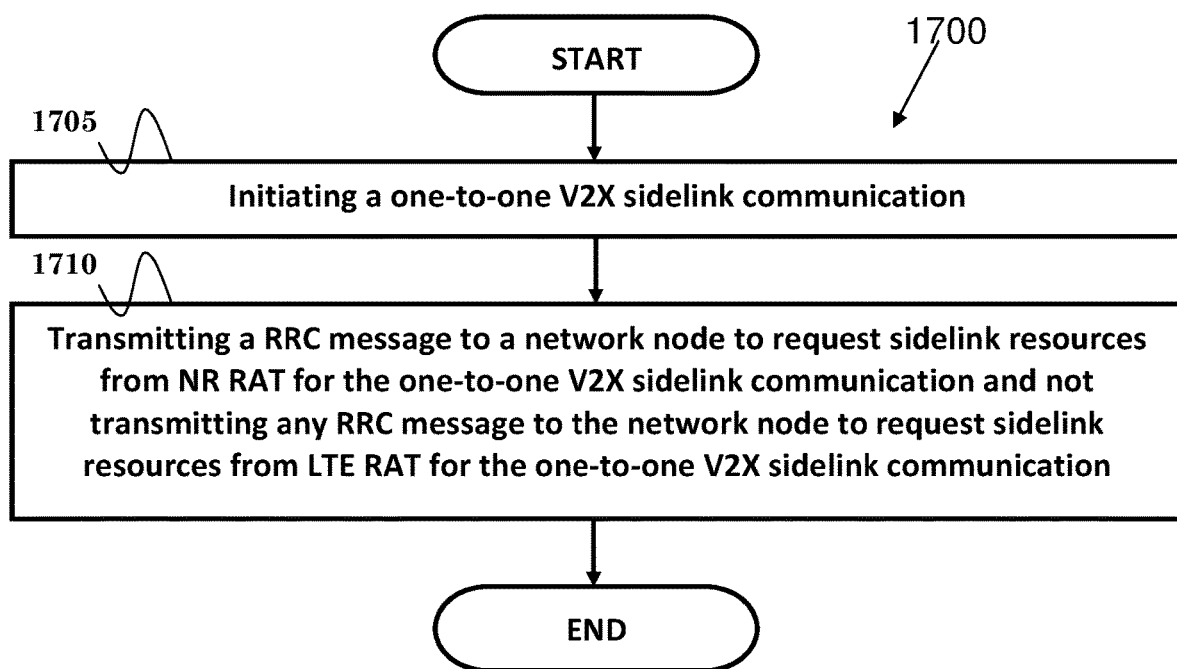
FIG. 17 is a flow chart according to one exemplary embodiment.

FIG. 17 is a flow chart 1700 according to one exemplary embodiment from the perspective of a UE for the UE to request sidelink resources for an one-to-one V2X sidelink communication, wherein the UE supports both LTE RAT and NR RAT. In step 1705, the UE initiates a one-to-one V2X sidelink communication. In step 1710, the UE transmits a RRC message to a network node to request sidelink resources from NR RAT for the one-to-one V2X sidelink communication, and does not transmit any RRC message to the network node to request sidelink resources from LTE RAT for the one-to-one V2X sidelink communication.

In one embodiment, the network node could be a base station (e.g. gNB). The RRC message could be a SidelinkUEInformation. The UE may not be allowed to transmit any RRC message to the network node to request sidelink resources from LTE RAT for the one-to-one V2X sidelink communication.

In one embodiment, the UE could transmit a BSR (Buffer Status Report) for indicating buffer sizes for the one-to-one V2X sidelink communications for requesting sidelink resources from NR RAT. The UE could be in RRC_CONNECTED state.

Referring back to FIGS. 3 and 4, in one exemplary embodiment of a UE for the UE to request sidelink resources for an one-to-one V2X sidelink communication, the device 300 includes a program code 312 stored in the memory 310. The CPU 308 could execute program code 312 to enable the UE (i) to initiate a one-to-one V2X sidelink communication, and (ii) to transmit a RRC message to a network node to request sidelink resources from NR RAT for the one-to-one V2X sidelink communication and, not transmit any RRC message to the network node to request sidelink resources from LTE RAT for the one-to-one V2X sidelink communication. Furthermore, the CPU 308 can execute the program code 312 to perform all of the above-described actions and steps or others described herein.

Figure 18:
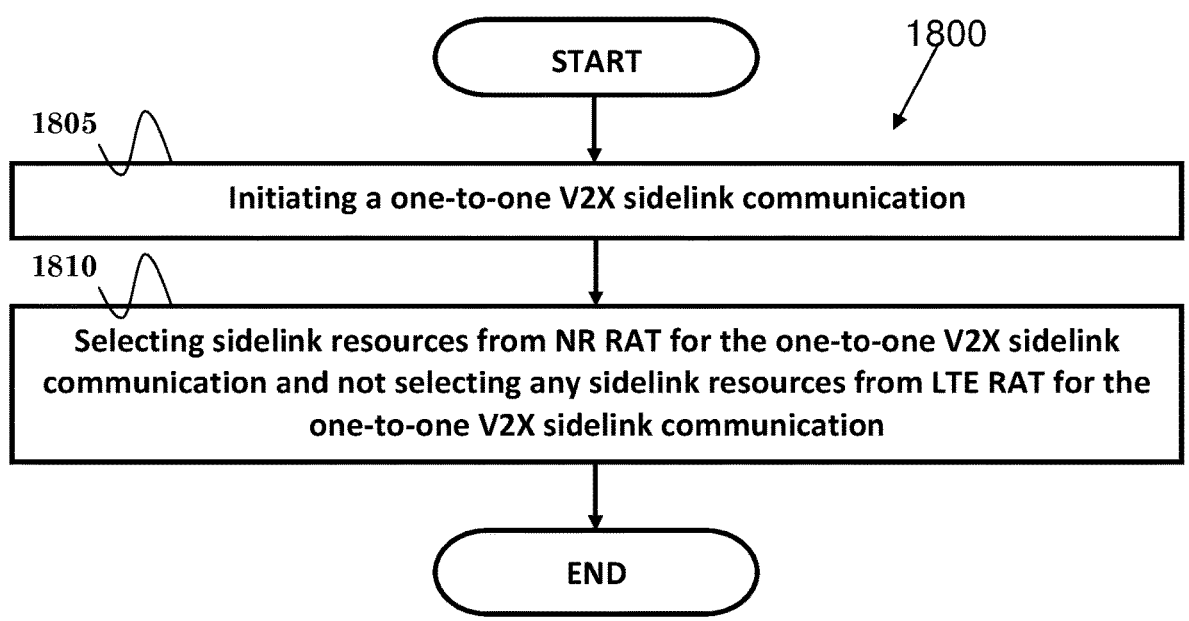
FIG. 18 is a flow chart according to one exemplary embodiment.

FIG. 18 is a flow chart 1800 according to one exemplary embodiment from the perspective of a UE for the UE to select sidelink resources for an one-to-one V2X sidelink communication, wherein the UE supports both LTE RAT and NR (New Radio) RAT. In step 1805, the UE initiates a one-to-one V2X sidelink communication. In step 1810, the UE selects sidelink resources from NR RAT for the one-to-one V2X sidelink communication and does not select any sidelink resources from LTE RAT for the one-to-one V2X sidelink communication.

In one embodiment, the UE may not be allowed to select any sidelink resources from LTE RAT for the one-to-one V2X sidelink communication.

Referring back to FIGS. 3 and 4, in one exemplary embodiment of a UE for the UE to request sidelink resources for an one-to-one V2X sidelink communication, the device 300 includes a program code 312 stored in the memory 310. The CPU 308 could execute program code 312 to enable the UE (i) to initiate a one-to-one V2X sidelink communication, and (ii) to select, sidelink resources from NR RAT for the one-to-one V2X sidelink communication, and not select any sidelink resources from LTE RAT for the one-to-one V2X sidelink communication. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences.

In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a UE (User Equipment) to request sidelink resources for a one-to-one V2X (Vehicle-to-Everything) sidelink communication, comprising:
   initiating the one-to-one V2X sidelink communication;
   transmitting a RRC (Radio Resource Control) message to a network node to request sidelink resources for the one-to-one V2X sidelink communication, wherein the RRC message includes QoS (Quality of Service) information of a V2X service and a Cast Type of the one-to-one V2X sidelink communication; and
   receiving an AS (Access Stratum) layer configuration for the one-to-one V2X sidelink communication from the network node, wherein the AS layer configuration includes the Cast Type of the one-to-one V2X sidelink communication.

2. The method of claim 1, wherein the network node is a base station (or gNB).

3. The method of claim 1, wherein the RRC message is a SidelinkUEInformation.

4. The method of claim 1, further comprising:
   transmitting a BSR (Buffer Status Report) for indicating buffer sizes for the one-to-one V2X sidelink communications for requesting sidelink resources.

5. The method of claim 1, wherein the UE is in RRC_CONNECTED state.

6. The method of claim 1, wherein the Cast Type is set to Unicast.

7. The method of claim 1, wherein the RRC message also includes a service flow identity.

8. The method of claim 1, wherein the RRC message further includes a destination of the one-to-one V2X sidelink communication.

9. A UE (User Equipment), comprising:
   a control circuit;
   a processor installed in the control circuit; and
   a memory installed in the control circuit and operatively coupled to the processor;
   wherein the processor is configured to execute a program code stored in the memory to:
      initiate a one-to-one V2X (Vehicle-to-Everything) sidelink communication;
      transmit a RRC (Radio Resource Control) message to a network node to request sidelink resources for the one-to-one V2X sidelink communication, wherein the RRC message includes QoS (Quality of Service) information of a V2X service and a Cast Type of the one-to-one V2X sidelink communication; and
      receive an AS (Access Stratum) layer configuration for the one-to-one V2X sidelink communication from the network node, wherein the AS layer configuration includes the Cast Type of the one-to-one V2X sidelink communication.

10. The UE of claim 9, wherein the network node is a base station (or gNB).

11. The UE of claim 9, wherein the RRC message is a SidelinkUEInformation.

12. The UE of claim 9, wherein the processor is further configured to execute a program code stored in the memory to:
   transmit a BSR (Buffer Status Report) for indicating buffer sizes for the one-to-one V2X sidelink communications for requesting sidelink resources.

13. The UE of claim 9, wherein the UE is in RRC_CONNECTED state.

14. The method of claim 9, wherein the Cast Type is set to Unicast.

15. The method of claim 9, wherein the RRC message also includes a service flow identity.

16. The method of claim 9, wherein the RRC message further includes a destination of the one-to-one V2X sidelink communication.

* * * * *